United States Patent
Afridi et al.

(10) Patent No.: US 12,176,805 B2
(45) Date of Patent: Dec. 24, 2024

(54) CONTROL ARCHITECTURE FOR AC-DC AND DC-AC CONVERSION CAPABLE OF BIDIRECTIONAL ACTIVE AND REACTIVE POWER PROCESSING

(71) Applicant: The Regents of the University of Colorado, a body corporate, Denver, CO (US)

(72) Inventors: Khurram K. Afridi, Boulder, CO (US); Usama Anwar, Los Angeles, CA (US); Dragan Maksimovic, Boulder, CO (US); Robert W. Erickson, Boulder, CO (US)

(73) Assignee: THE REGENTS OF THE UNIVERSITY OF COLORADO, A BODY CORPORATE, Denver, CO (US)

( * ) Notice: Subject to any disclaimer, the term of this patent is extended or adjusted under 35 U.S.C. 154(b) by 0 days.

(21) Appl. No.: 15/927,918

(22) Filed: Mar. 21, 2018

(65) Prior Publication Data
US 2018/0278181 A1    Sep. 27, 2018

Related U.S. Application Data

(60) Provisional application No. 62/474,466, filed on Mar. 21, 2017.

(51) Int. Cl.
| | |
|---|---|
| H02M 1/42 | (2007.01) |
| G05F 1/70 | (2006.01) |
| H02M 7/797 | (2006.01) |

(52) U.S. Cl.
CPC .............. *H02M 1/4233* (2013.01); *G05F 1/70* (2013.01); *H02M 7/797* (2013.01)

(58) Field of Classification Search
CPC ...... H02M 1/12; H02M 1/4233; H02M 7/797; G05F 1/70; Y02B 70/126
See application file for complete search history.

(56) References Cited

U.S. PATENT DOCUMENTS

| | | | | |
|---|---|---|---|---|
| 4,193,111 | A * | 3/1980 | Wester | H02M 1/081 323/211 |
| 5,283,726 | A * | 2/1994 | Wilkerson | H02M 1/4233 323/207 |
| 2001/0036086 | A1* | 11/2001 | Pascu | H02J 3/32 363/17 |
| 2002/0145897 | A1* | 10/2002 | Hanaoka | H02M 1/0085 363/84 |
| 2009/0015214 | A1* | 1/2009 | Chen | G05F 1/70 323/205 |
| 2009/0034300 | A1* | 2/2009 | Ito | H02M 1/4233 363/17 |

(Continued)

*Primary Examiner* — Fred E Finch, III
(74) *Attorney, Agent, or Firm* — Workman Nydegger

(57) ABSTRACT

A control architecture that overcomes limitations of conventional ac-dc converters and enables bidirectional active and reactive power processing is provided. In one implementation, for example, this may be achieved through the use of unrectified sensed ac signals in the generation of the control commands for the converter. This control architecture, in this example implementation, eliminates or at least reduces zero crossing distortions in the ac current of the converter even with relatively low bandwidth controllers. The concept can be applied to different power stage topologies.

11 Claims, 23 Drawing Sheets

(56) References Cited

U.S. PATENT DOCUMENTS

| | | | |
|---|---|---|---|
| 2010/0171480 A1* | 7/2010 | Ye | G05F 1/70 323/283 |
| 2013/0293192 A1* | 11/2013 | Abe | B60L 11/182 320/108 |
| 2013/0301323 A1* | 11/2013 | Iyasu | H02M 7/797 363/123 |
| 2014/0313795 A1* | 10/2014 | Mi | H02M 1/44 363/44 |
| 2014/0328097 A1* | 11/2014 | Gumaer | H02M 1/4225 363/89 |
| 2015/0085550 A1* | 3/2015 | Mueller | H02M 3/158 363/132 |
| 2017/0098993 A1* | 4/2017 | Scherbaum | H02M 1/42 |
| 2017/0244317 A1* | 8/2017 | Kondo | H02M 3/155 |
| 2018/0302006 A1* | 10/2018 | Smidt | H02M 1/4233 |

\* cited by examiner

CONTROL ARCHITECTURE FOR AC-DC AND DC-AC CONVERSION CAPABLE OF BIDIRECTIONAL ACTIVE AND REACTIVE POWER PROCESSING

CROSS-REFERENCE TO RELATED APPLICATIONS

This application claims the benefit of U.S. provisional application No. 62/474,466, filed 21 Mar. 2017, which is hereby incorporated by reference as though fully set forth herein.

STATEMENT OF GOVERNMENT SPONSORED RESEARCH

This invention was made with government support under grant number DE-EE0006921 awarded by the U.S. Department of Energy. The government has certain rights in the invention.

BACKGROUND

Unity power factor (UPF) ac-to-dc (ac-dc) conversion is used in many applications, including power supplies for electronic loads, electric vehicle chargers and aircraft powering units. Unity power factor converters provide the benefit of drawing current from the ac grid that is at line frequency (without any harmonics) and in phase with line voltage. This may significantly reduce harmonic content fed into the grid and improves the overall efficiency of the grid system. Additionally, dc-to-ac (dc-ac) conversion, also known as inversion, finds many applications, including uninterruptible power supplies (UPS) and solar inverters; in these applications having distortion free ac current is also very desirable. Also, there are applications that need both ac-dc and dc-ac power conversion to take place, i.e., power can flow in both directions. Applications that require this capability include electric vehicle chargers capable of bi-directional power flow grid-to-vehicle (G2V) and vehicle-to-grid (V2G), where an electric vehicle consumes energy from the grid in G2V mode and supplies energy to the grid in V2G mode. Other applications include grid-tie inverters capable of buying and selling electricity for a house from/to the grid. Apart from the bidirectional active (real) power processing capability, it is very beneficial in some applications to have the ability to absorb or deliver reactive power. For example, the latest requirements for solar inverters include having the ability to provide both active and reactive power to the grid. Similarly, electric vehicles could provide voltage support to the grid if their chargers were capable of consuming and supplying both active and reactive power from/to the grid. This necessitates the need for power converter topologies and control architectures capable of achieving ac-dc and dc-ac conversion (from here on referred to as bidirectional ac-dc conversion) with the ability to process both active and reactive power.

Conventional ac-dc converters process power in a unidirectional manner, i.e., either achieving ac-dc conversion or dc-ac conversion. Furthermore, conventional converters are designed to process only active power. As an example, a very common conventional ac-dc conversion stage is shown in FIG. 1: it rectifies an input ac voltage and then employs a dc-dc conversion stage controlled to shape the input current. Rectified input ac voltage ensures that input of the dc-dc converter remains positive for a complete line cycle. The rectified ac input voltage is typically utilized to generate the current reference. The presence of the diode bridge in the conventional ac-dc converter topology limits the converter from processing bidirectional power (i.e., also functioning as a dc-ac converter). The bridgeless boost converter topology eliminates the diode-bridge rectification stage. However, conventional control architectures are still synthesized in a manner that power can only be processed in one direction. Control architecture for ac-dc conversion employing bridgeless boost converter is shown in FIG. 2. The control architecture senses input voltage and input current, rectifies them and then employs them for generating the control signal $v_{c_1}$. Duty cycles $d_n$ for the converter are then generated from the control signal $v_{c_1}$ by looking at polarity of input voltage. Since, both input voltage and input current are rectified, no phase shift can be introduced in the reference command, limiting the converter to achieve only UPF ac-dc conversion. Furthermore, the process of rectification can introduce zero crossing distortions in the input current, deteriorating the converter performance.

BRIEF SUMMARY

A control architecture that overcomes limitations of conventional ac-dc converters and enables bidirectional active and reactive power processing is provided. In one implementation, for example, this can be achieved through the use of unrectified sensed ac signals in the generation of the control commands for the converter. This control architecture eliminates or at least reduces zero crossing distortions in the ac current of the converter even with relatively low bandwidth controllers. The concept can be applied to different power stage topologies.

In some implementations a converter may employ ac-dc conversion, dc-ac conversion or both along with active and reactive power processing capabilities. Example applications include, but are not limited to, universal power supplies, electronic appliances powering units, battery chargers, grid tied and stand-alone solar inverters and motor drives.

In one implementation, for example, an ac-dc bidirectional power converter includes a power stage and a controller. The controller utilizes one or more sensed ac voltage and/or sensed ac current without any rectification of the sensed ac voltage and/or current to provide one or more duty cycles to one or more switches of the power stage. The controller may, for example, compute one or more duty cycles directly from an ac voltage and/or ac current.

The control architecture may be configured to sense input voltage, input current and output voltage. In one particular implementation, the controller may be further configured to generate a reference command using the sensed input voltage without employing any rectification. The controller is configured to compare the reference command with the sensed input current (without any rectification) and an error is passed to a compensator of the controller. The compensator is configured to process the error and generate a control command, which is used by a duty cycle generation block of the controller to generate duty cycles for the converter.

The duty cycle generation block may be configured to generate a set of duty cycle commands from the control signal. The duty cycle generation block, for example, may generate two or more duty cycle commands for the power stage using one control signal. In one particular implementation, for example, a duty cycle generation block is configured to use a single control command and determines converter duty cycle commands from it.

One example implementation of an ac-dc bidirectional power converter allows for the removal of passive rectification typically employed in ac-dc conversion and uses bridgeless power conversion topologies with active switches to achieve ac-dc conversion. By allowing the converter to have active switches, a control structure is provided that allows the converter to achieve superior performance as compared to traditional architectures. Instead of employing rectification in the sensed signals and then determining converter duty cycles from the polarity of input voltage, no rectification is employed in this example ac-dc bidirectional power converter. Signals of both positive and negative polarity are used in the controller to generate a control signal. The control signal is then further utilized to determine different duty cycles to be generated from one control signal. An addition of a phase shift in the reference command can allow processing of both active and reactive power bidirectionally giving it the capabilities to achieve ac-dc/dc-ac conversion.

Although, many bridgeless ac-dc/dc-ac converter topologies can be synthesized, example topologies include a distributed inductor bridgeless boost converter ac-dc/dc-ac conversion control architecture and a one leg inductor bridgeless boost converter ac-dc/dc-ac conversion control architecture.

DETAILED DESCRIPTION

Figure 1:
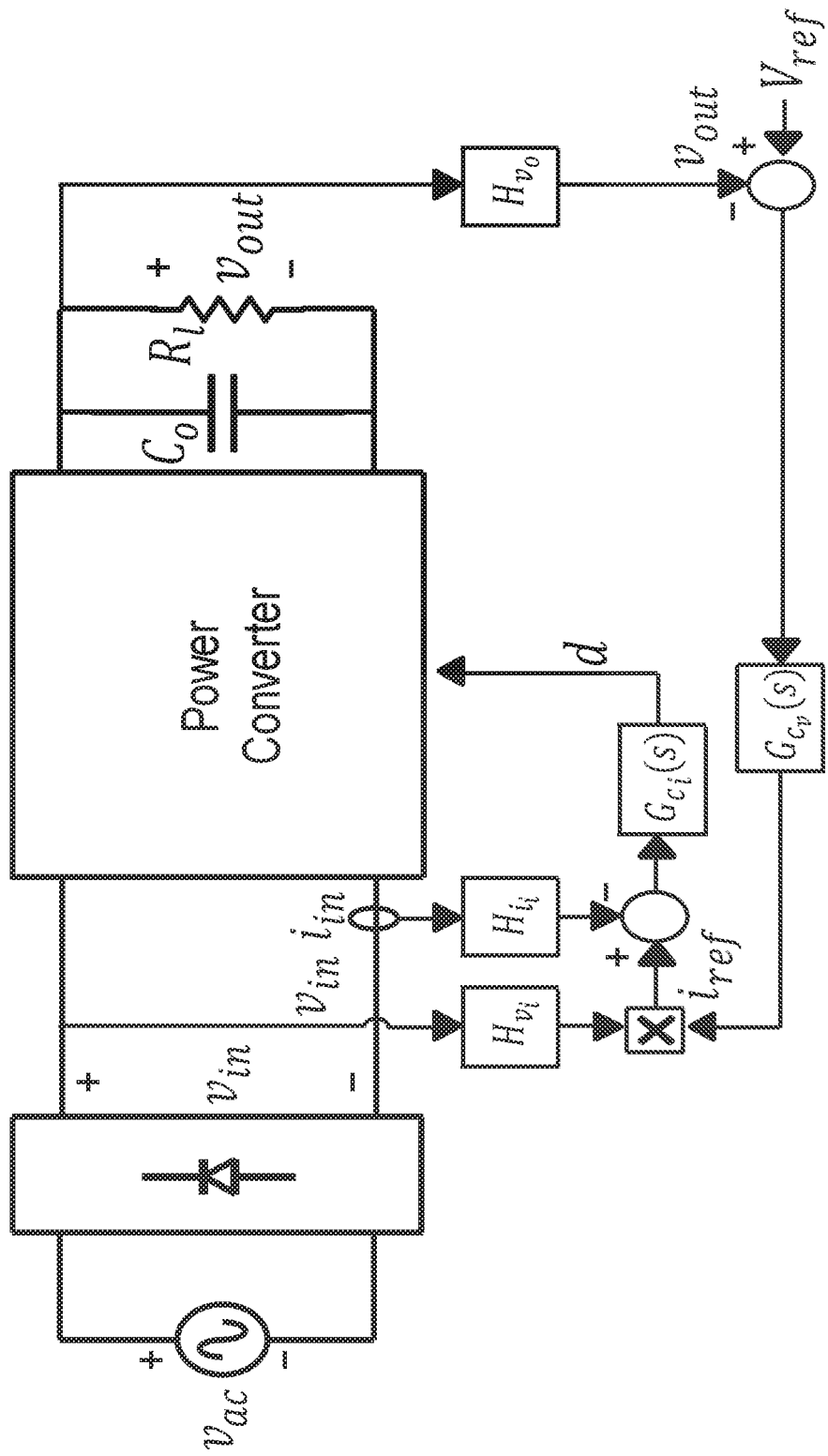
FIG. 1 shows a conventional ac-dc conversion stage in which a rectified input ac voltage $v_{in}$ is used to generate an input current reference $i_{ref}$.
Figure 2:
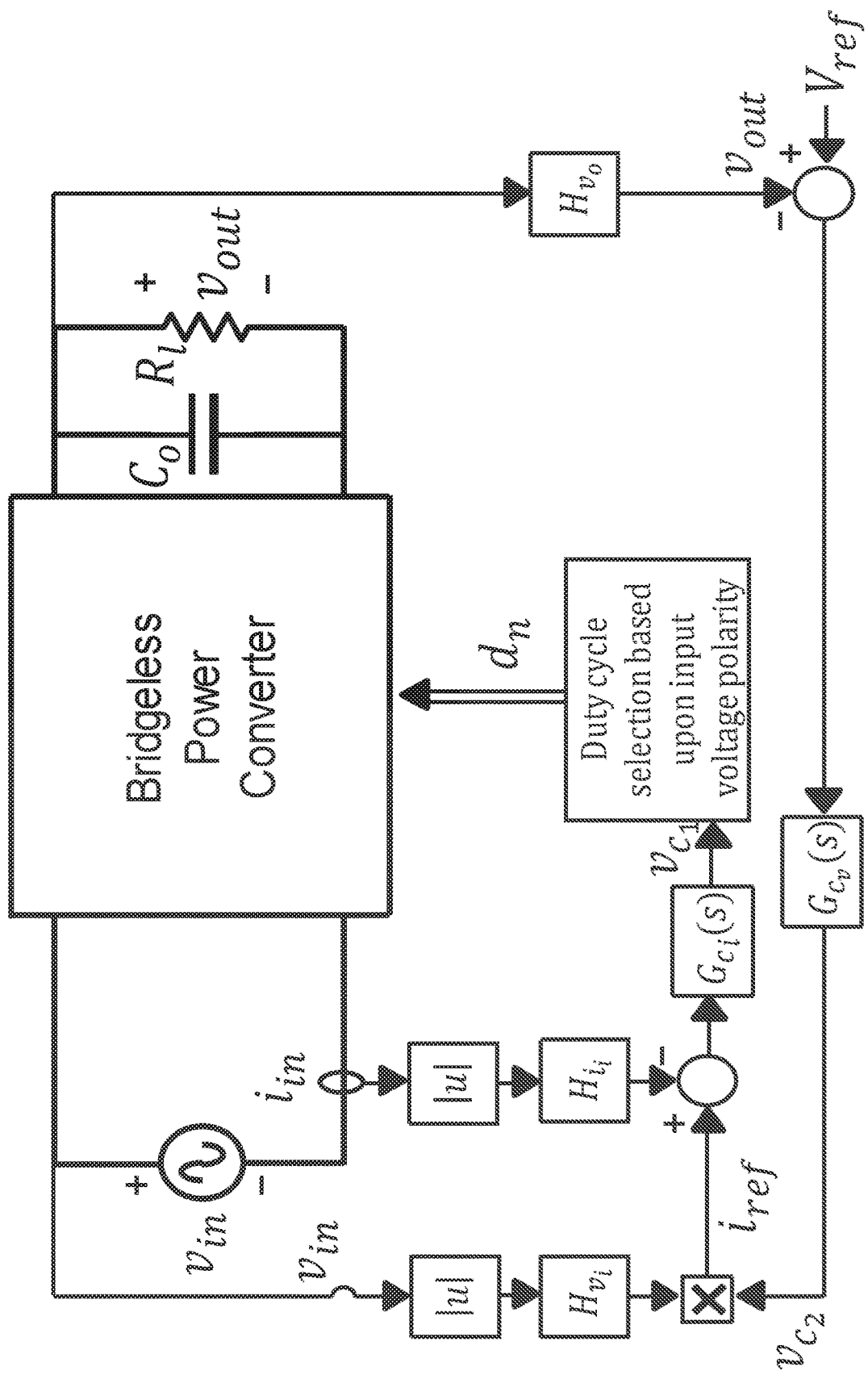
FIG. 2 shows a conventional architecture for ac-dc conversion using a bridgeless boost power converter. In this example, the controller senses input voltage and input current and rectifies them. Rectified sensed inputs are used to implement the controller.
Figure 3A:
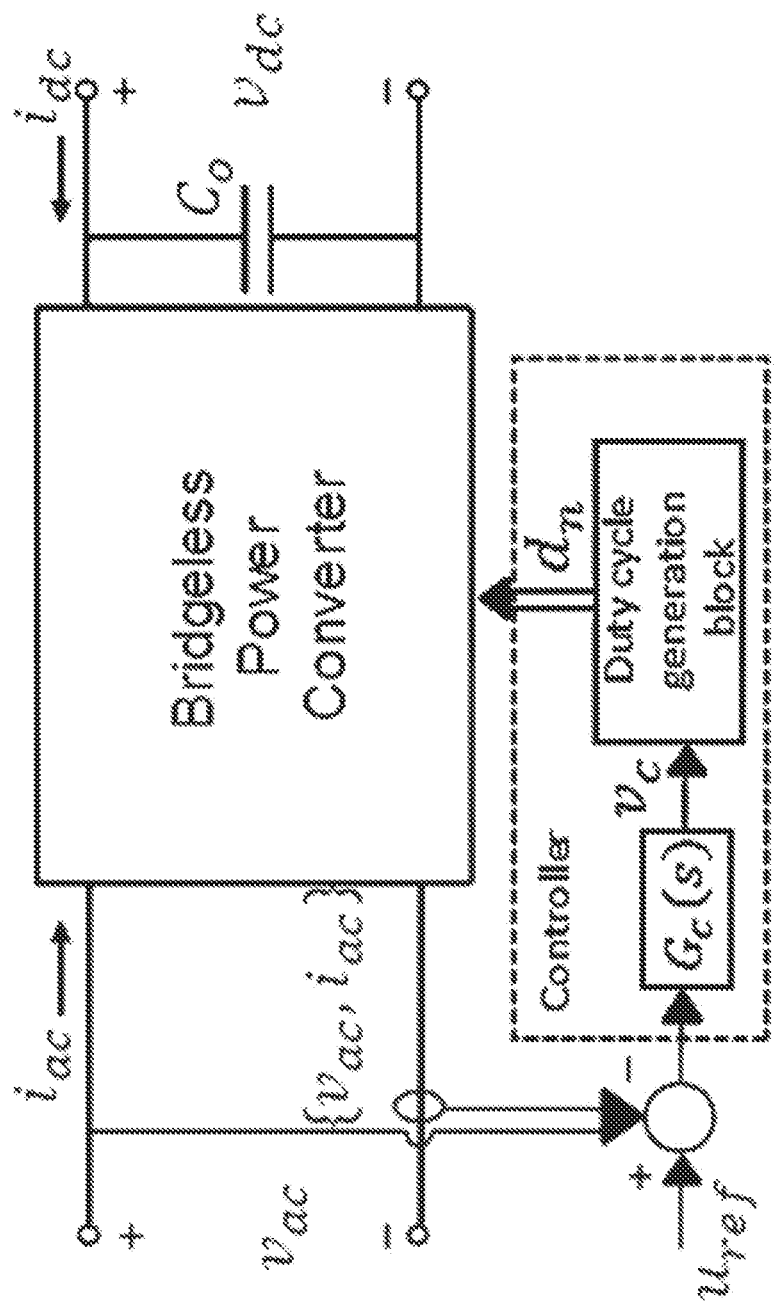
FIG. 3A shows an example implementation of an ac-dc/dc-ac conversion control architecture. In this particular implementation, input ac variables are sensed, compared with a reference command $u_{ref}$ and an error is passed to a controller. The controller comprises a compensator and a duty cycle generation block.

A control architecture configured to achieve ac-dc and dc-ac conversion with capabilities to process active and reactive power bi-directionally is referred here as an ac-dc/dc-ac converter. A general architecture of an example implementation of an ac-dc/dc-ac converter is shown in FIG. 3A. In this particular implementation, the converter is a two-port converter, with one port having ac voltage across it and the other port having dc voltage across it. In the architecture of this particular implementation, a bridgeless power converter is employed for power processing. The converter is bidirectional in nature, capable of processing power in both directions. No rectification in the power stage takes place, allowing the power processing converter to process ac voltages and currents having any phase shift between them. One of the ac variables (ac voltage or ac current) is sensed, compared with the reference command $u_{ref}$ and the error is computed between the two signals. It is noted that sensed signal and reference command can have both positive and negative polarities and no rectification is employed in the sensed signal as well. The error signal is passed to the controller. The controller processes the error signal and generates duty cycle command(s) $d_n$ for the converter. The controller comprises a compensator followed by a duty cycle generation block. Compensator shapes loop gain of the converter and the duty cycle generation block maps the control signal $v_c$ to duty cycle(s) $d_n$ of the converter. When this control architecture is used, the power processing converter along with the duty cycle generation block appears to be working at line frequency to the compensator. Thus, the compensator can be designed to be relatively low bandwidth and the sensed signals can be of both positive and negative polarities. The duty cycle generation block takes care of generating duty cycle(s) $d_n$ from the control signal $v_c$. Duty cycle generation block can be synthesized by looking at how duty cycle command(s) $d_n$ for ideal ac-dc conversion, as dictated by the converter intrinsic open loop characteristics, can be generated from one control signal $v_c$. In one implementation, for example, the duty cycle generation block uses one control signal and generates duty cycle commands for the converter such that the sensed signal ($v_{ac}$ or $i_{ac}$)=$u_{ref}$ in steady state.

Figure 3B:
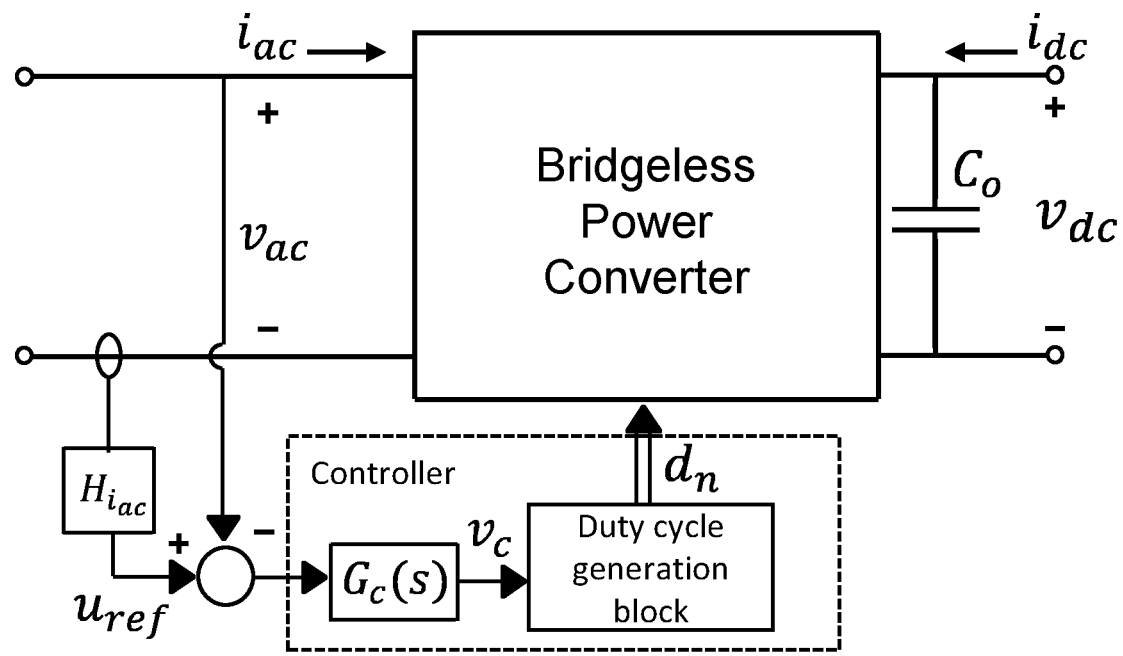
FIG. 3B shows an example implementation of an ac-dc/dc-ac conversion control architecture. In this particular implementation, a sensed or received ac current is scaled to generate a reference, and the reference is compared to a sensed or received ac voltage.

FIG. 3B shows another example implementation of an ac-dc/dc-ac conversion control architecture. In this particular implementation, a sensed or received ac current is scaled to generate a reference, and the reference is compared to a sensed or received ac voltage.

Figure 4:
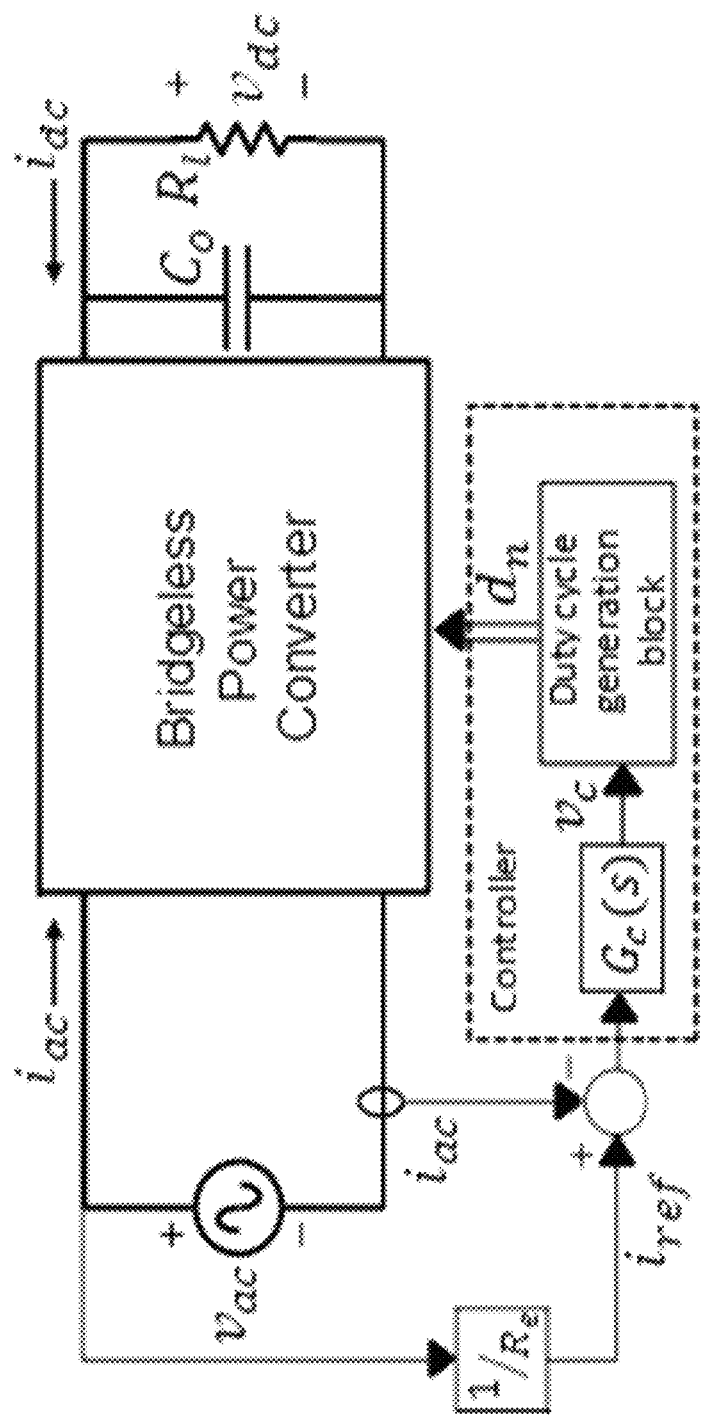
FIG. 4 shows an example implementation of a unity power factor ac-dc converter control architecture current control loop.
Figure 5:
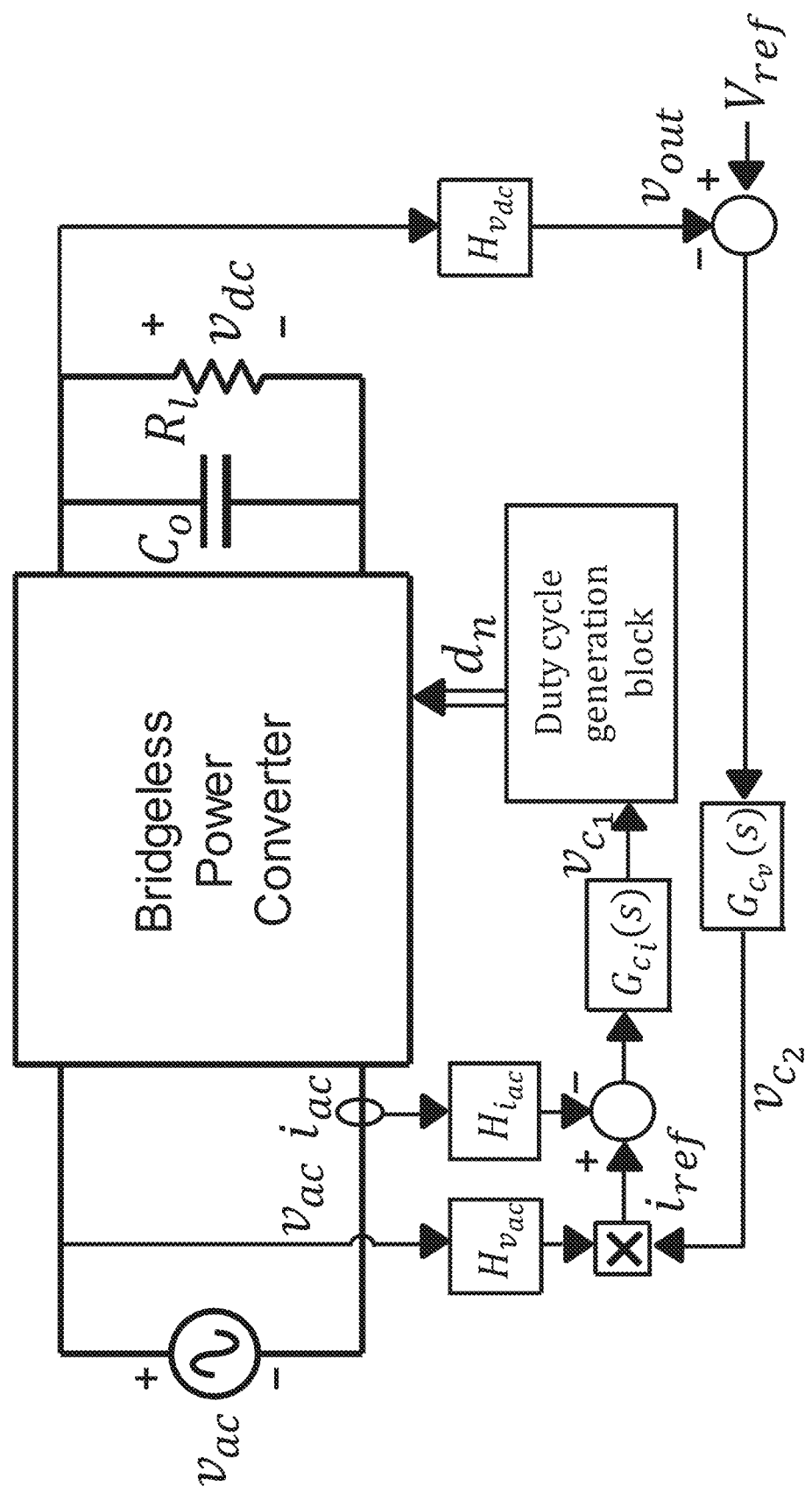
FIG. 5 shows an example implementation of a unity power factor ac-dc converter control architecture. In this particular implementation, the control architecture comprises an outer voltage loop and an inner current control loop.

The converter, such as shown in FIG. 3A or 3B, can be used for ac-dc conversion and dc-ac conversion along with capabilities to process active and reactive power bi-directionally depending upon how the reference command is generated. Example architecture for UPF ac-dc conversion is shown in FIGS. 4 and 5, where active power (input voltage in phase with input current) is drawn from ac source, converted to dc power and is delivered to the load. FIG. 4 shows an example implementation of a converter inner current control loop, while FIG. 5 shows an example implementation of a complete ac-dc conversion control architecture comprising an inner current control loop and an outer voltage loop. Since input current is in phase with line voltage, reference command can be generated from ac voltage of the converter. Thus, line voltage is sensed and scaled by $1/R_e$ to generate the reference command. Here $R_e$ is emulated input resistance of the converter and in steady state is given as $$R_e = \frac{H_{i_{ac}}}{H_{v_{ac}} v_{c_2}}$$

as shown in FIGS. 4 and 5. In steady state, the relationship between input (ac) voltage and input (ac) current of the converter can be expressed as:

$$a. \quad i_{ac}(t) = \frac{v_{ac}(t)}{R_e}. \tag{1}$$

In UPF ac-dc converters, ac voltage is a sine wave with frequency $\omega_l$ (nominally 50-60 Hz). So, one can express the relationship (1) as:

$$a. \quad i_{ac}(t) = \frac{v_{ac}\sin(\omega_l t)}{R_e}. \tag{2}$$

Active power delivered to the converter can be expressed as:

$$P = \frac{V_{ac,rms}^2}{R_e}. \tag{3}$$

Scaling of input voltage $H_{v_{ac}}$ can be done to control power flow into the converter, which in turn determines output voltage of the converter.

Figure 6:
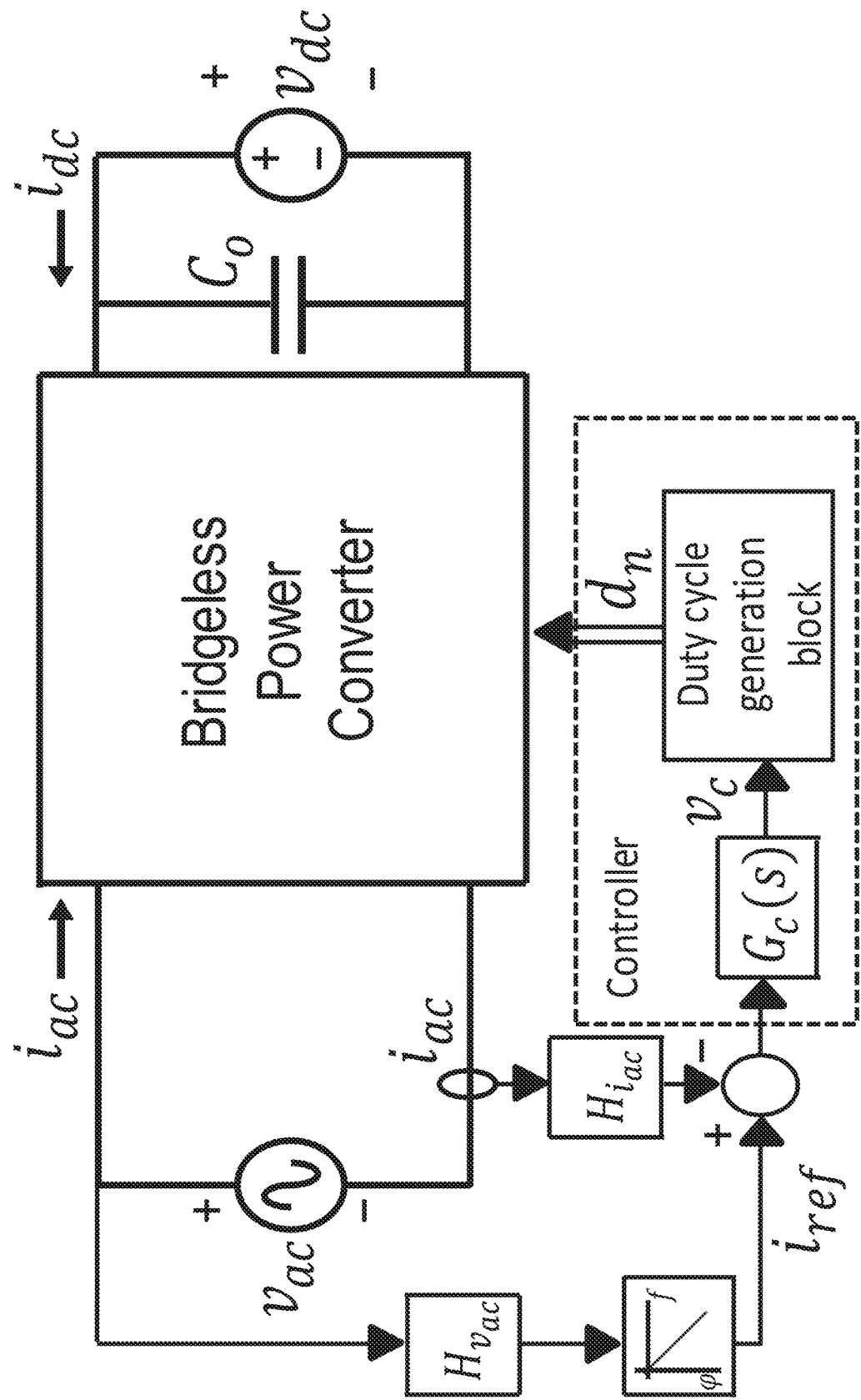
FIG. 6 shows an example implementation of an active and reactive power processing ac-dc converter architecture. In this particular implementation, the converter architecture is bidirectional in nature and is configured to process both active and reactive power bidirectionally.

The converter can process reactive power if phase shift $\phi$ is introduced in current reference with respect to input voltage of the converter. One possible architecture of ac-dc converter processing active and reactive power is shown in FIG. 6. Input voltage of the converter is sensed, scaled and phase shifted to generate the current reference command. The rest of the control architecture is discussed above. In steady state converter input (ac) voltage and input (ac) current of the converter can be expressed as:

$$a. \quad v_{ac}(t) = V_{ac}\sin(\omega_l t), \tag{4}$$

$$i_{ac}(t) = \frac{V_{ac}\sin(\omega_l t - \phi)}{R_e}.$$

Where $$R_e = \frac{H_{i_{ac}}}{H_{v_{ac}}}$$

is emulated input resistance of the converter and $\phi$ is the phase difference between input voltage and input current of the converter. Active and reactive power processed by the converter are given by:

$$P = \frac{V_{ac,rms}^2}{R_e}\cos(\phi), \tag{5}$$

$$Q = \frac{V_{ac,rms}^2}{R_e}\sin(\phi)$$

The converter processes active power and delivers it to the load, while reactive power is processed without delivering it to load.

Figure 7:
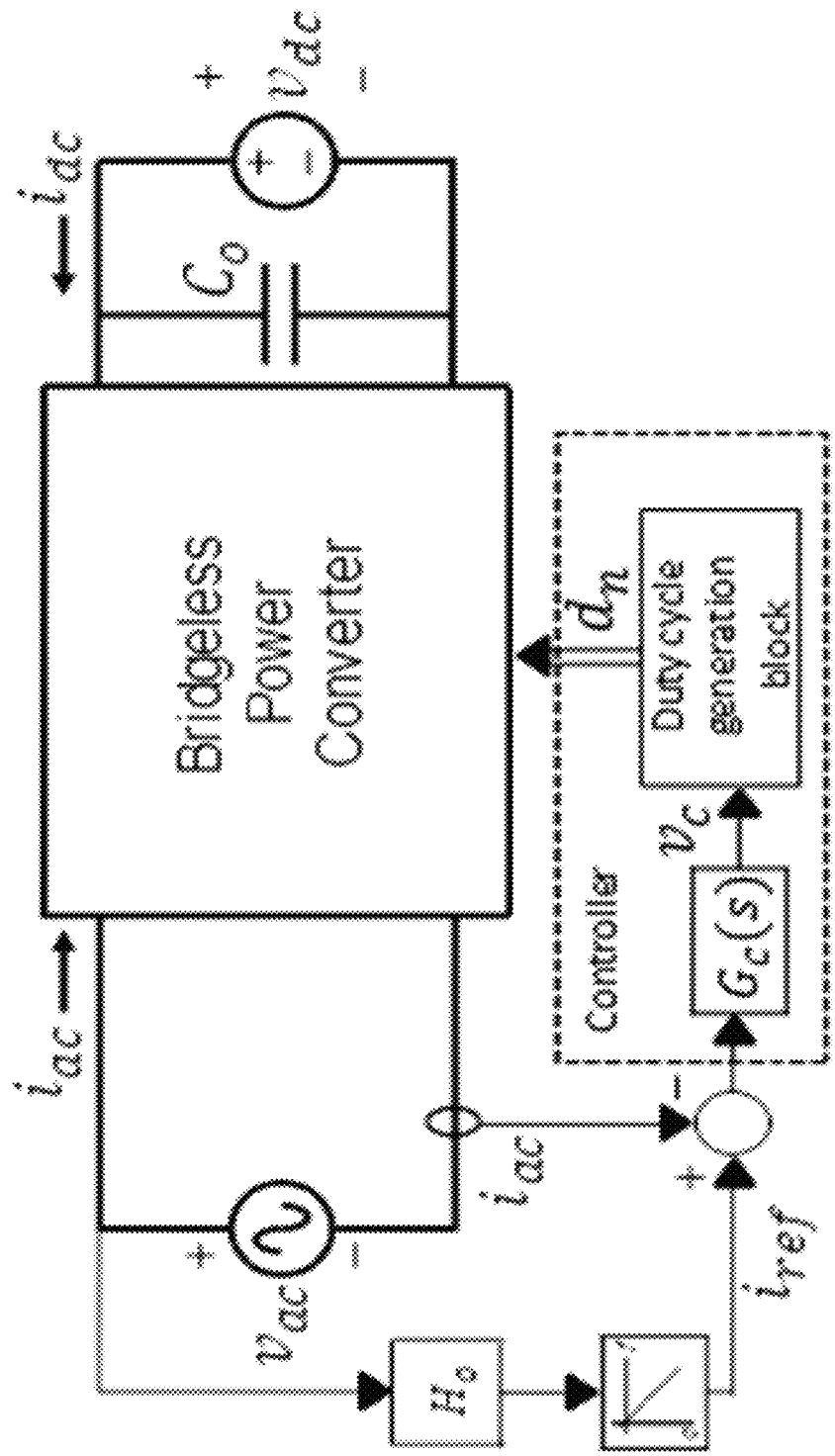
FIG. 7 shows an example implementation of a grid-tie dc-ac converter configured to deliver active and reactive power to the grid.

The converter can be used for dc-ac conversion when source and load are swapped. Two possible realizations of dc-ac conversion are of practical importance. These include grid tied and stand-alone systems. In grid-tied systems power is taken from a dc source and is delivered to an operational grid. To achieve dc-ac conversion in grid-tied systems, ac current flowing into the converter is sensed. Reference command is generated by sensing, scaling and phase shifting the line voltage as shown in FIG. 7. If ac voltage is phase shifted by 180° to generate the current reference command, then only active power is delivered to the grid. On the other hand, with an arbitrary phase shift between input ac voltage and current, both active and reactive power can be delivered to the grid.

Figure 8:
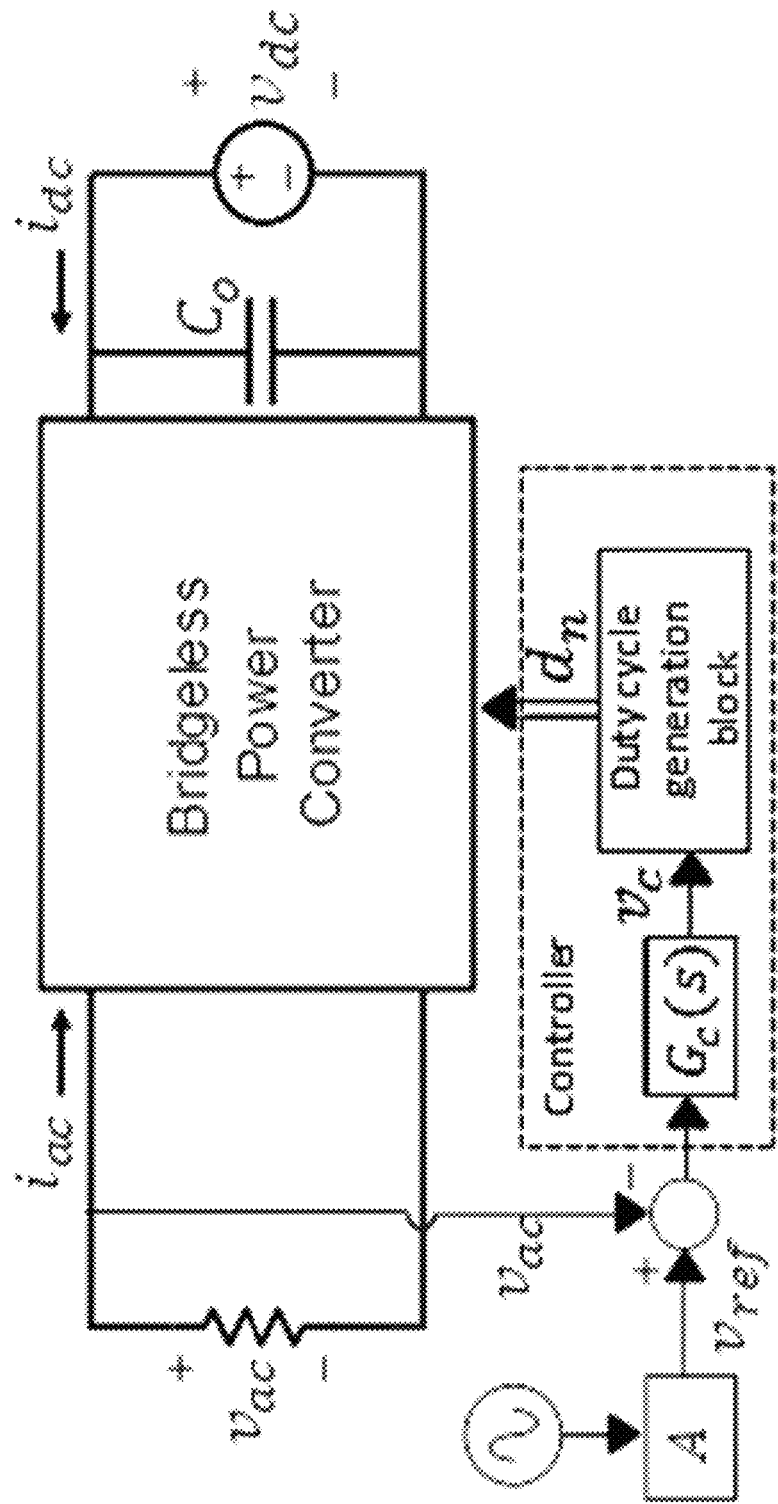
FIG. 8 shows an example implementation of a stand-alone dc-ac converter configured to deliver active and reactive power to the load.

In stand-alone dc-ac converters, output voltage instead of output current of the converter is controlled. This can be achieved by sensing the output (ac) voltage and comparing it with the reference command to generate an error signal. The error signal is processed as discussed earlier. A reference command can be generated, such as from either an independent sinusoidal source or a look up table. The converter architecture when controlled in this manner can provide both active and reactive power to the load and is shown in FIG. 8. In steady state, the converter output (ac) voltage can be expressed as:

$$v_{ac}(t) = A\, v_{ref}(t) \text{ and } v_{ref}(t) = V_{ref}\sin(\omega_l t),$$

Here $$A = \frac{H_{v_{ref}}}{H_{v_{ac}}}$$

and $H_{v_{ref}}$ is the reference sinusoidal source gain.

Figure 9:
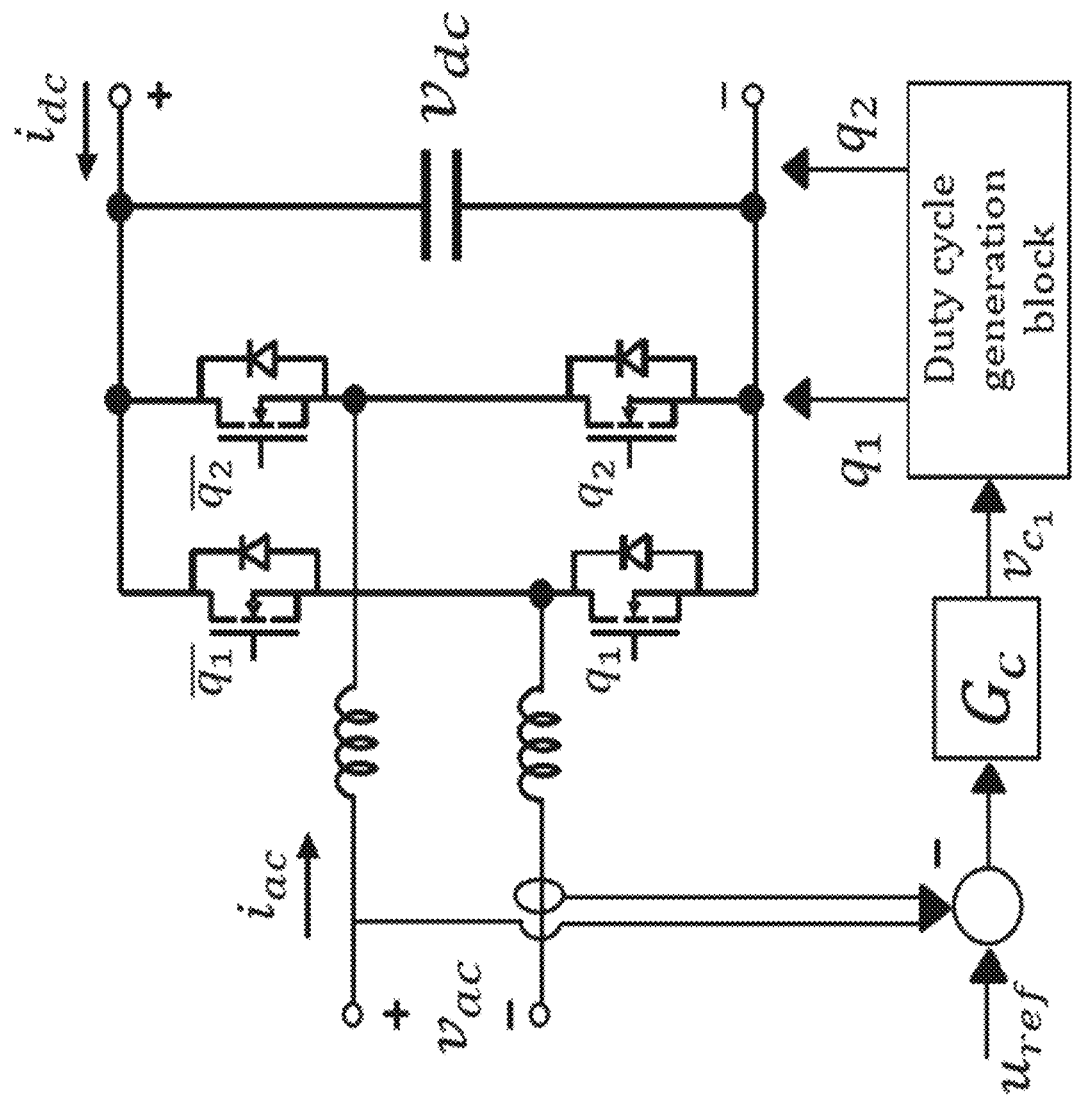
FIG. 9 shows an example implementation of a bridgeless boost ac-dc/dc-ac converter.
Figure 10A:
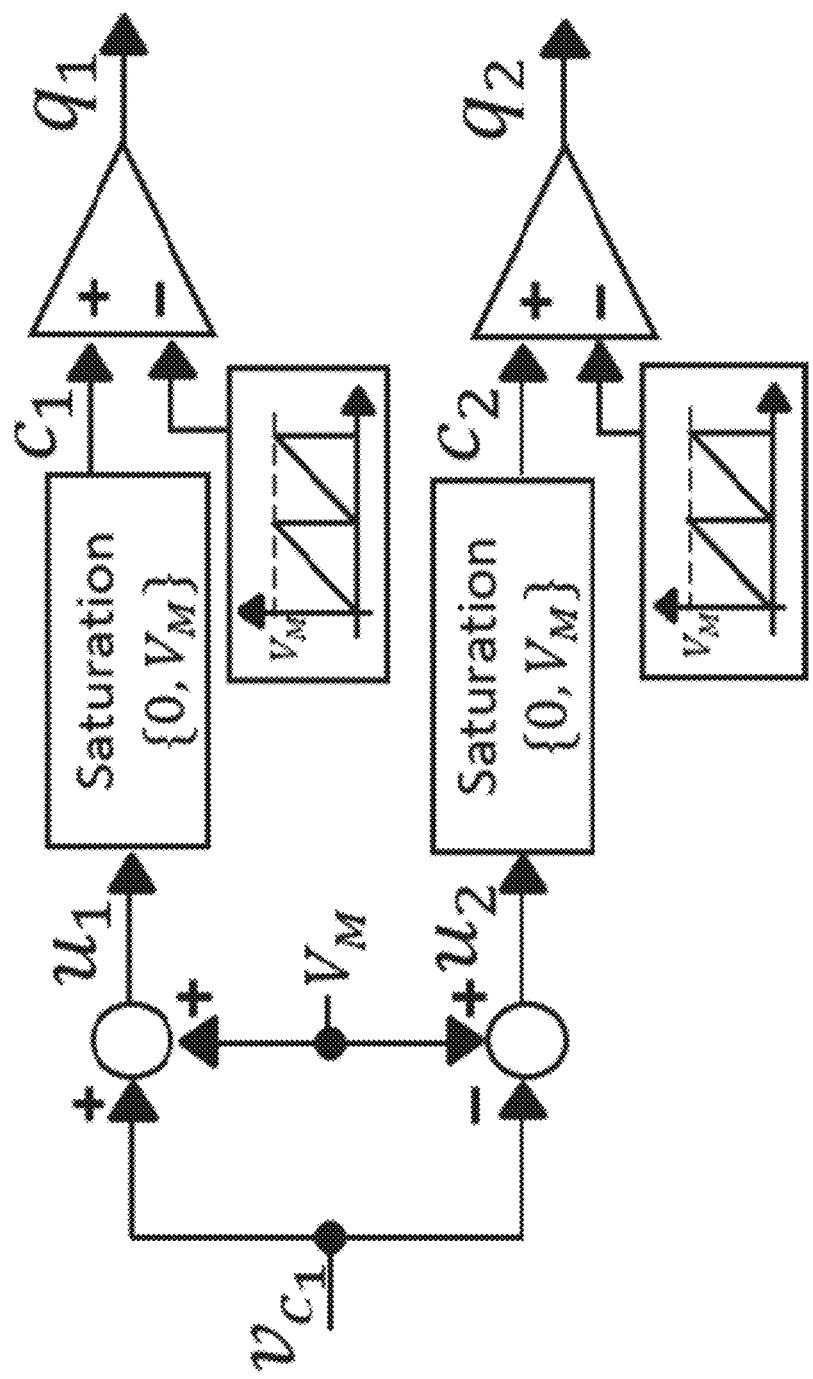
FIG. 10 (a) shows details of an example implementation of a duty cycle generation block, and FIG. 10 (b) shows an example implementation of an input-output relationship of a saturation block used by the duty cycle generation block.
Figure 10B:
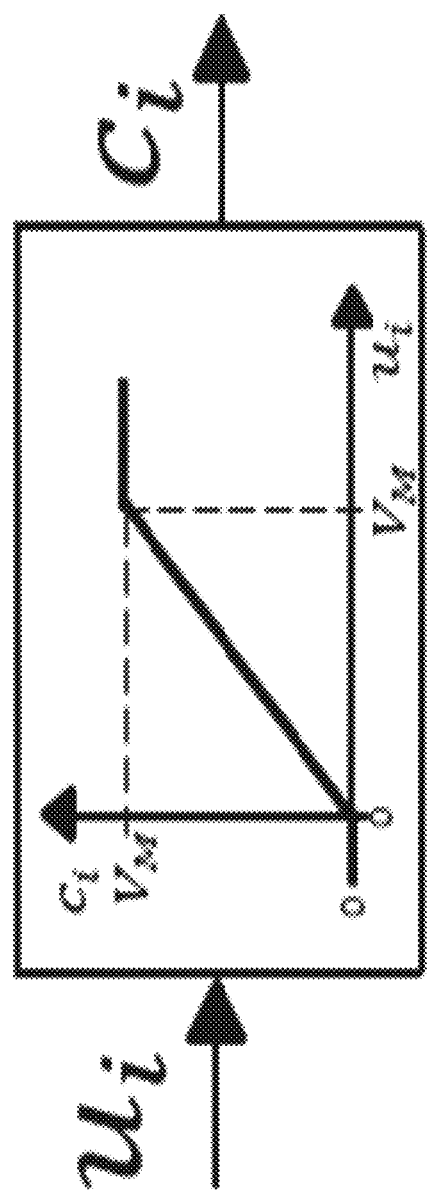

One example implementation of an ac-dc/dc-ac converter is shown in FIG. 9. The power converter employed in this implementation is commonly known as bridgeless boost converter. The converter is operated in continuous conduction mode (CCM) over the line cycle by switching the half-bridge switches in a complementary manner. To achieve the control functionality, two half bridges are switched independently. The controller senses ac voltage or current of the converter. The sensed signal is compared with the reference command to generate an error, which is then processed by the controller to generate a control command $v_{c_1}$. The controller command $v_{c_1}$ is processed further by a duty cycle generation block, as shown in FIG. 10, to generate the two duty cycle commands for the converter. Scaled duty cycle commands $c_1$ and $c_2$ are generated from the control signal $v_{c_1}$ by adding and subtracting the amplitude of the pulse-width modulator ramp $V_M$ respectively, and are allowed to saturate naturally when current transitions between the half bridges. When the duty cycle generation block is implemented as shown in FIG. 10, the feedback loop remains negative over the full line cycle of operation.

The converter can be used for different types of power conversion, including ac-dc conversion, dc-ac conversion along with capabilities to process active and reactive power bidirectionally depending upon how the reference command is generated, as has been discussed above. Details here are presented for an example UPF ac-dc conversion, which is an example implementation of one of the types of power conversion architectures presented earlier. Other types of power conversion are very similar in nature, with differences in how the reference command is generated as has previously been discussed.

In FIGS. 10 (a) and 10 (b), for example, FIG. 10 (a) shows details of an example duty cycle generation block, and FIG. 10 (b) shows an input-output relationship of a saturation block it employs. The duty cycle generation block, in this implementation, generates two duty cycle commands from one control signal. Control signal $v_{c_1}$ is added and subtracted from a ramp amplitude $V_M$ and passed through saturation block to generate control signals $c_1$ and $c_2$, where the control signals represent scaled version of duty cycles by $d_i = c_i/V_M$, $i \in \{1,2\}$. Control signals are then compared with the ramp to generate switch commands $q_1$ and $q_2$ of the converter. It can be noted that the ramp can be implemented as leading edge, lagging edge or up-down ramp.

Figure 11:
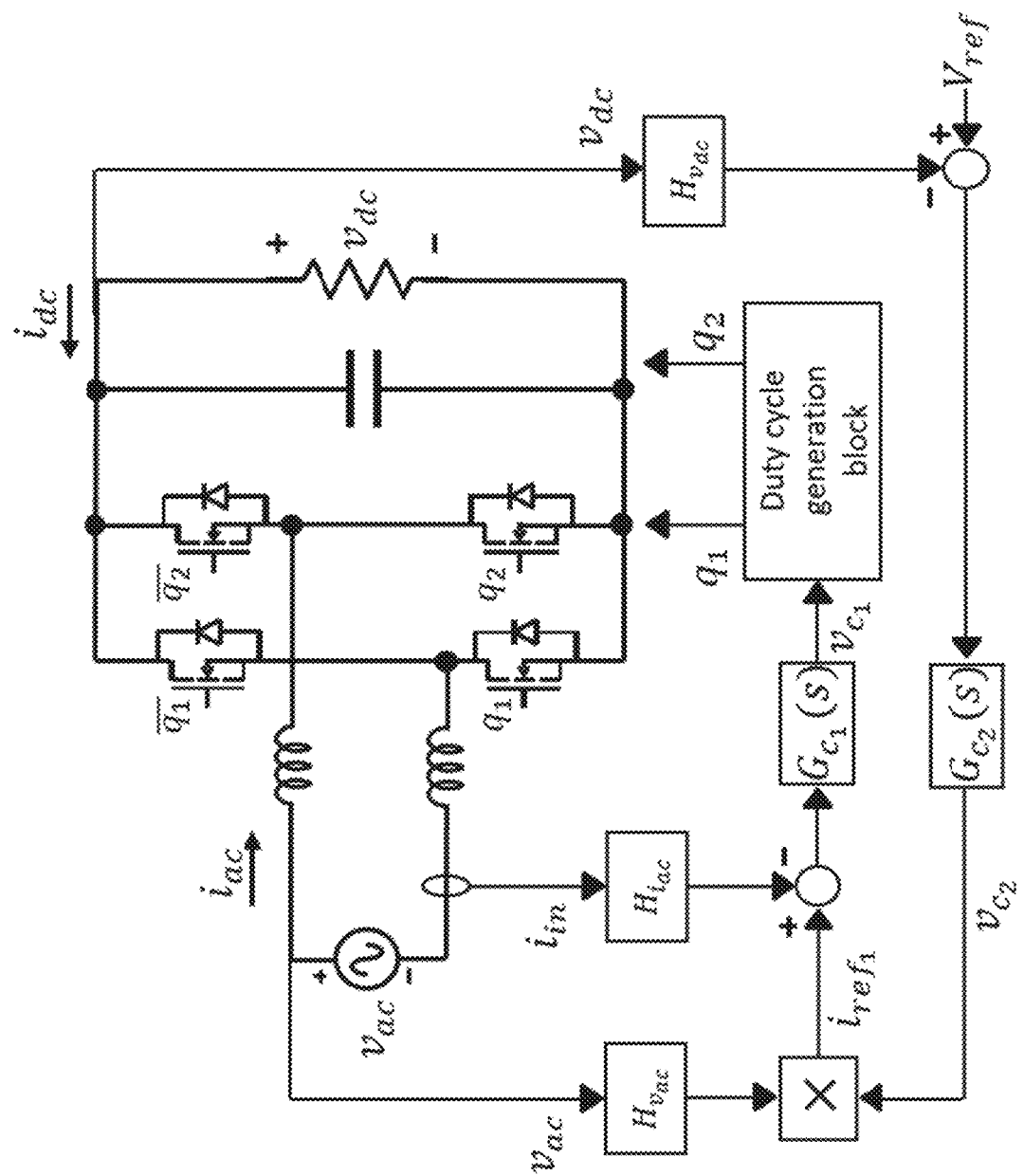
FIG. 11 shows an example implementation of a bridgeless boost ac-dc/dc-ac converter used for UPF ac-dc conversion.
Figure 12:
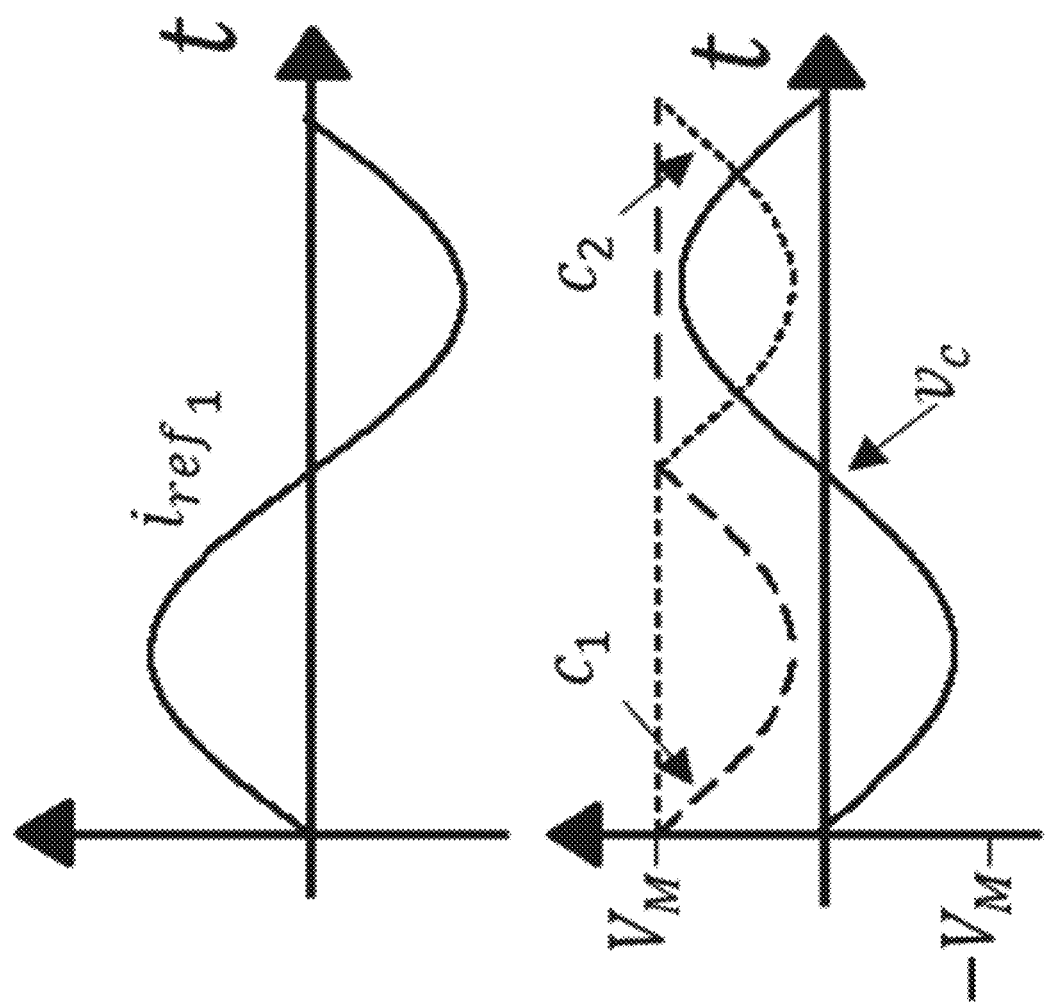
FIG. 12 shows an example implementation of a current reference, control command $v_{c_1}$ and duty cycles $d_1$ and $d_2$ plotted over half line cycle.

The bridgeless boost ac-dc/dc-ac converter shown in FIG. 9 can be used for UPF ac-dc conversion. The architecture, in the implementation shown in FIG. 11, for example, comprises an inner current control loop and an outer voltage loop. Duty cycle generation block, as shown in FIG. 10, and removal of rectification in sensed signals allows both active and reactive power to be processed In UPF ac-dc conversion, the converter shapes the input current to be in phase with input voltage of the converter. This results in achieving unity power factor, with converter ideally processing only active power. Reference command in UPF ac-dc conversion is generated by sensing and scaling input voltage as shown in FIG. 11. Input inductor current is sensed, compared with the current reference and the error is passed to the compensator. The compensator processes the error command and passes the generated control command $v_{c_1}$ to the duty cycle generation block. The controller command $v_{c_1}$ is used by the duty cycle generation block to generate two switch commands $q_1$ and $q_2$ for the converter. The duty cycle generation block automatically handles the transition between the two half-bridge legs of the converter and from the perspective of the controller, the converter appears to be operating at line frequency. Hence, the control signal is periodic with line frequency, as shown in FIG. 12.

Figure 13:
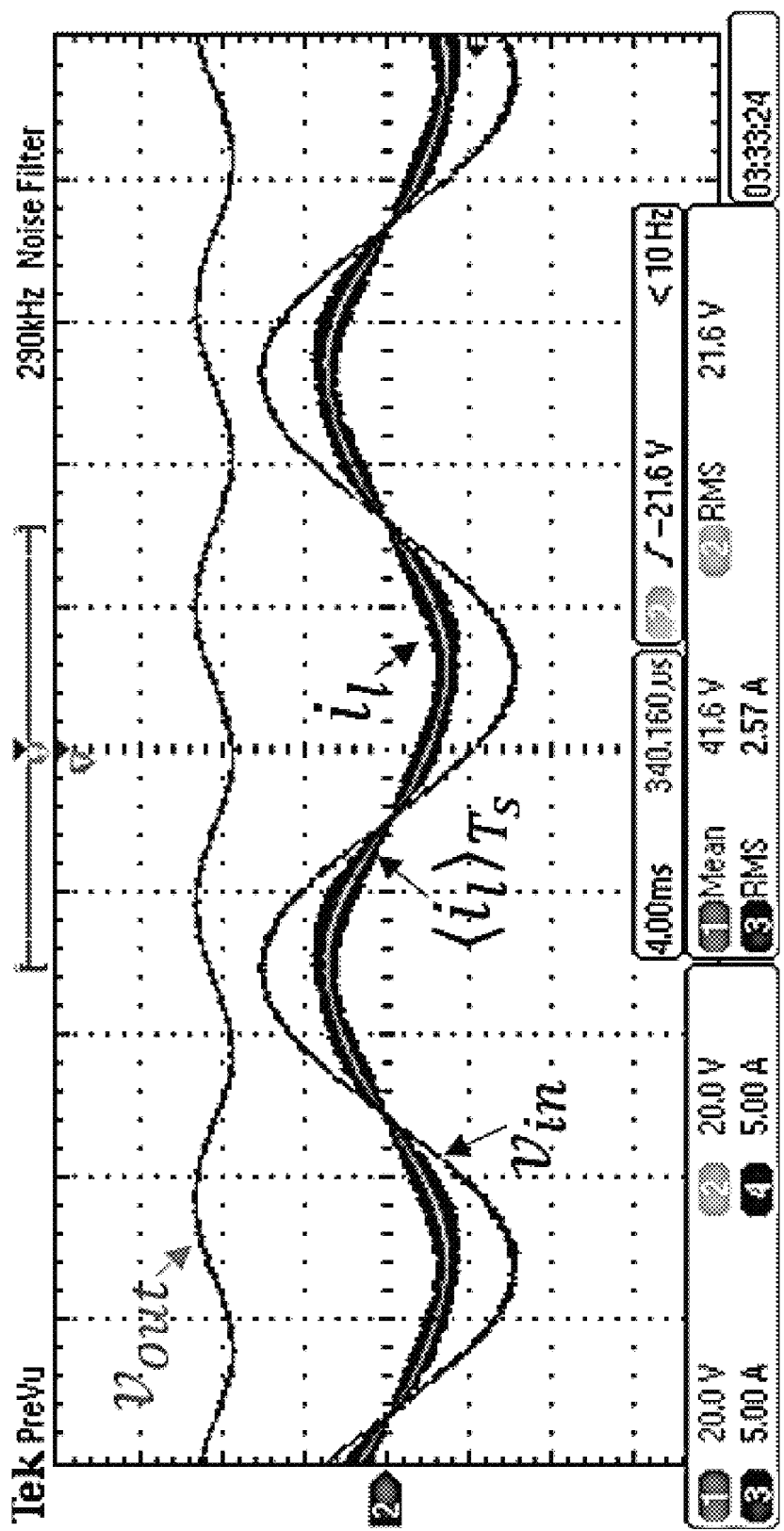
FIG. 13 shows an example implementation of power factor correction stage waveforms. In this particular implementation the input voltage is in phase with input current of the converter.

In one practical example, a detailed design of a 5 kW bridgeless boost PFC converter for an electric vehicle charger application utilizing silicon carbide MOSFETs and operating in continuous conduction mode (CCM) is provided. A switching frequency of 120 kHz is selected for the prototype bridgeless boost converter operating in CCM. FIG. 13 shows oscilloscope waveforms of measured voltage and current.

The design details of an example inductor, the SiC MOSFETs and the other major components utilized in this example of a bridgeless boost converter are given in Table 1.

TABLE 1

Table 1: Design details of the 5 kW Bridgeless Boost PFC converter utilizing Silicon Carbide devices and operating in continuous conduction mode (CCM)

| | |
|---|---|
| MOSFETs | HT-4201 module |
| | 1200 V, 25 mΩ, 68 A |
| | Silicon Carbide MOSFET |
| Output Capacitor | 80 µF, 850 V Film Capacitor |
| Coupled Inductor | 40 µH |
| | Ferrite core, Planar PCB Inductor |
| | 12 turns across 12 layers |
| Microcontroller | TI- TMS320F28069 |
| | 32 Bit CPU, 90 MHz |

Microcontroller

Figure 14:
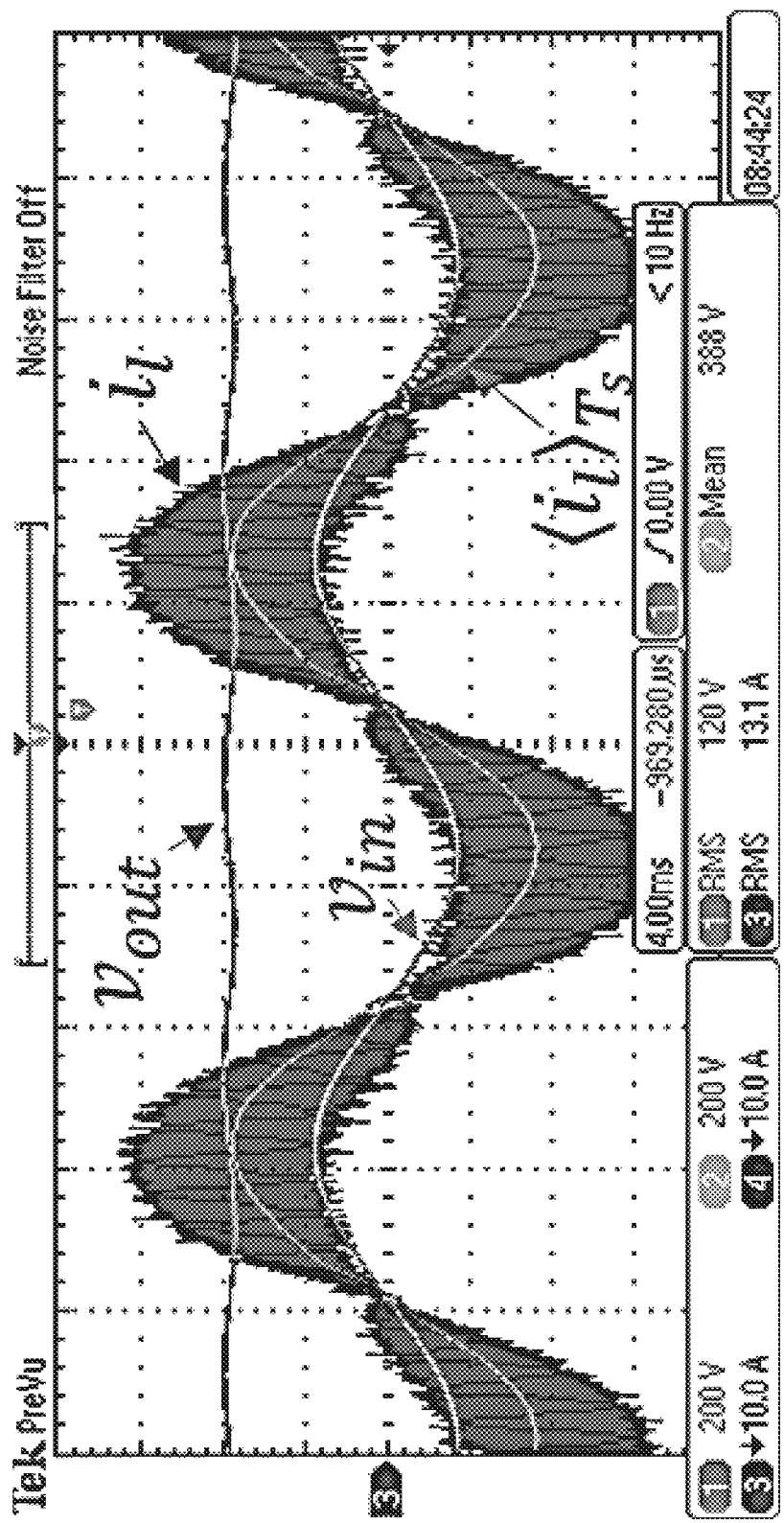
FIG. 14 shows input voltage $v_{in}$, input current $i_{in}$ and output voltage $v_{out}$ waveforms of an example implementation of a PFC converter.
Figure 15:
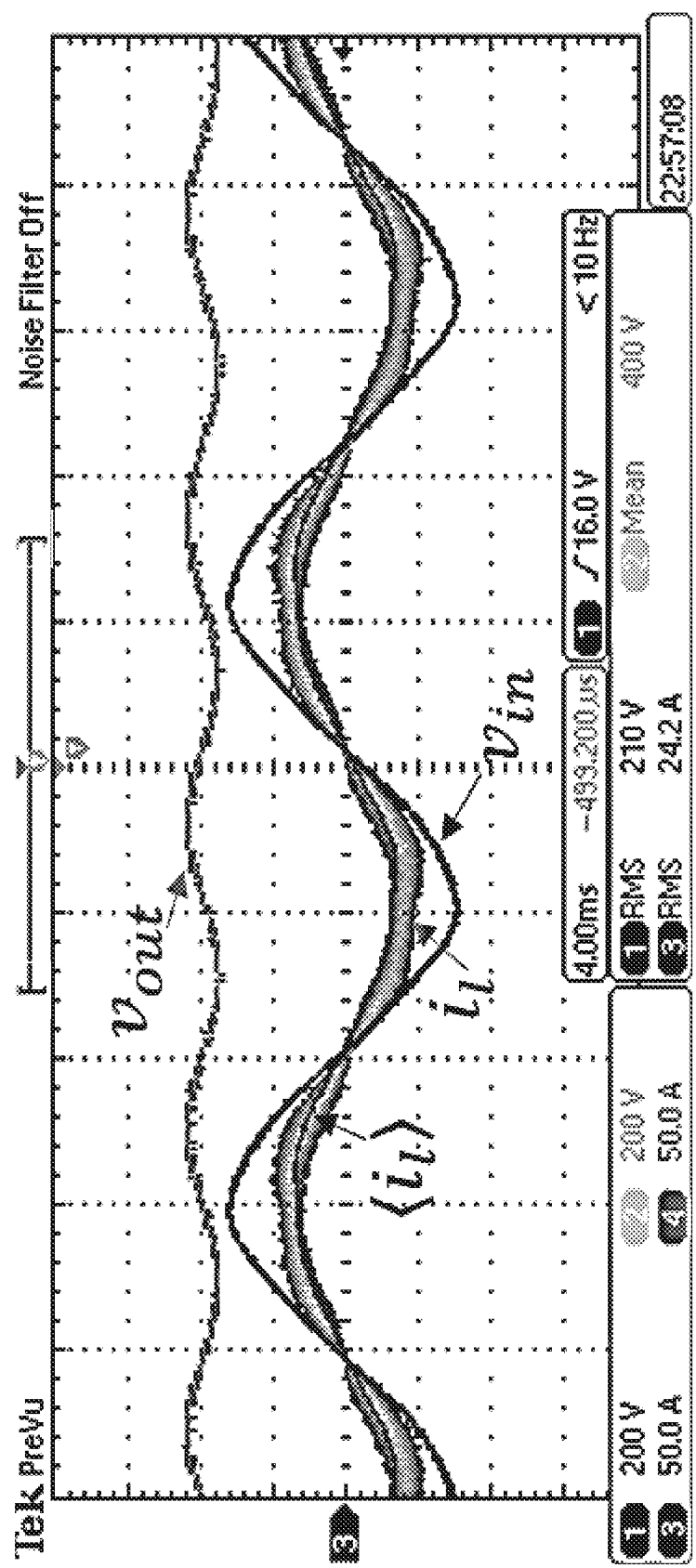
FIG. 15 shows input voltage $v_{in}$, input current $i_{in}$ and output voltage $v_{out}$ waveforms of an example implementation of a PFC converter.
Figure 16:
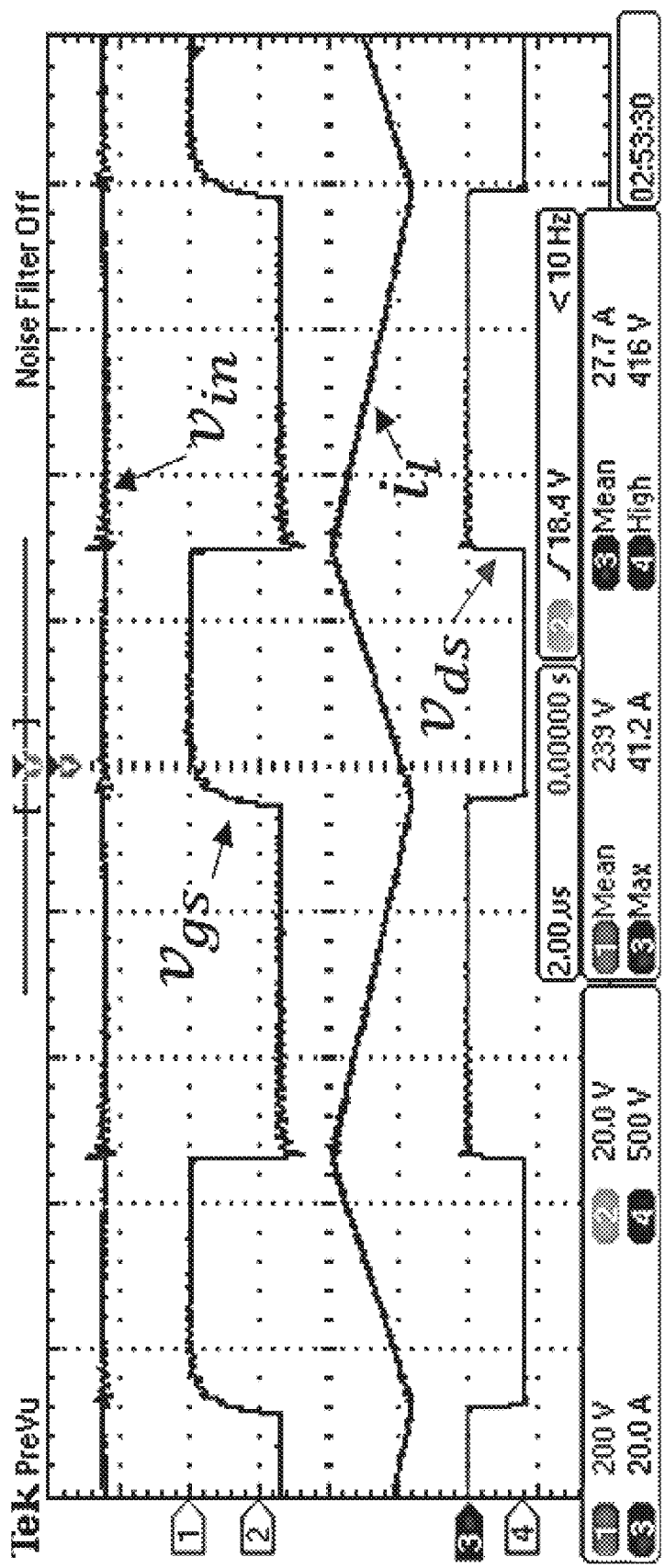
FIG. 16 shows switching waveforms of an example implementation of a bridgeless boost ac-dc converter.
Figure 17:
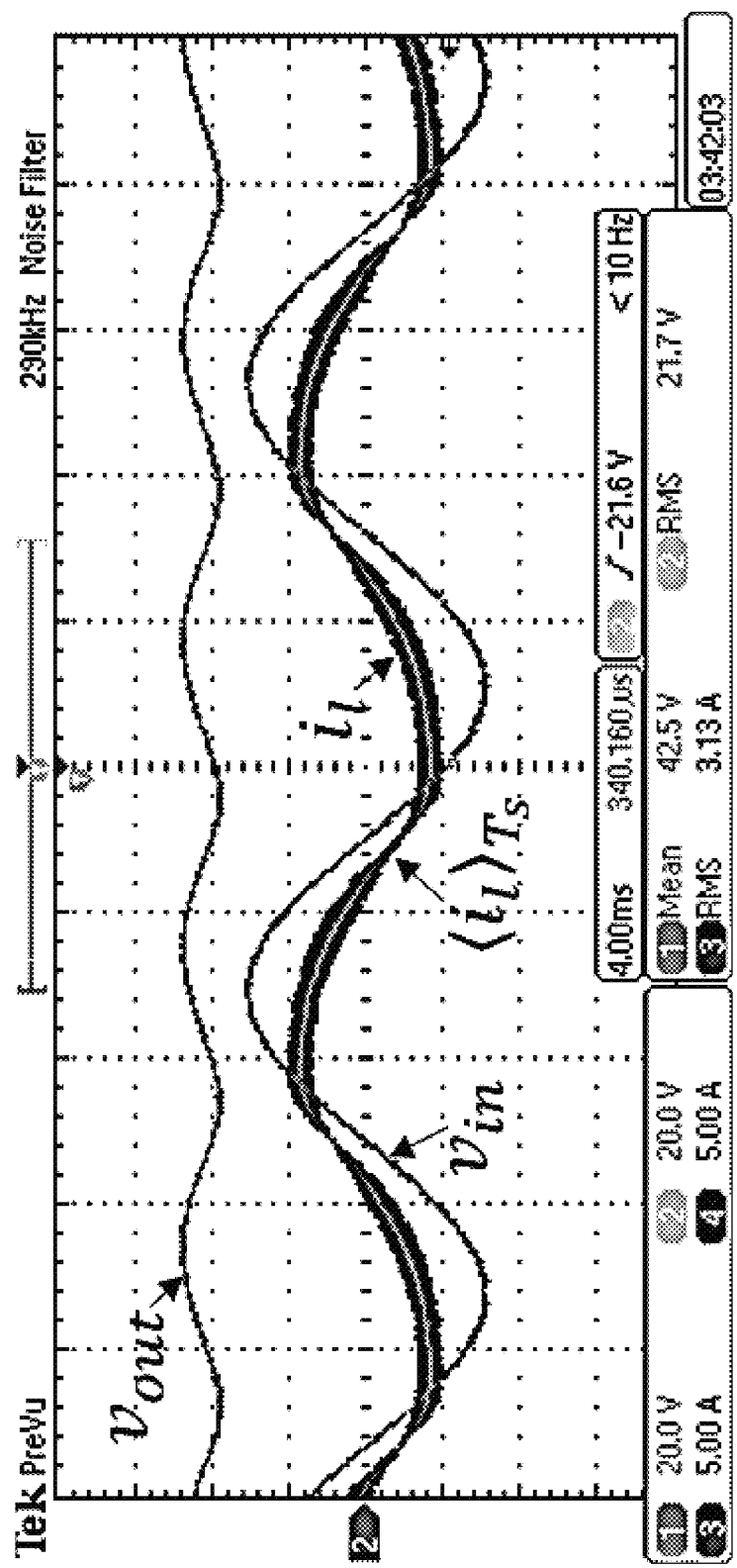
FIG. 17 shows power factor correction waveforms with phase shift introduced between input voltage and current of an example implementation of a converter. Significant phase shift between input voltage and input current of the converter can be observed in this example, validating active and reactive power processing capabilities of the converter.

The bridgeless boost PFC converter has been tested up to its full power of 5 kW. FIGS. 14, 15 and 16 show waveforms of the bridgeless boost converter operating at power levels of 60 W, 1.6 kW and 5 KW, respectively. It can be seen that the input current is nearly sinusoidal, and in phase with the line voltage. The PFC stage achieves a power factor of ~0.99 at 1.6 kW, demonstrating excellent performance due to the new control architecture. FIG. 17 shows the switching waveforms for the switch-node voltage, the MOSFETs drain-to-source voltage, the inductor current and the MOSFETs gate-to-source voltage. From these switching waveforms, it can be clearly observed that the converter exhibits minimal ringing and overshoot. This is due to careful circuit layout and the use of SiC devices packaged in modules with low lead inductances.

Figure 18:
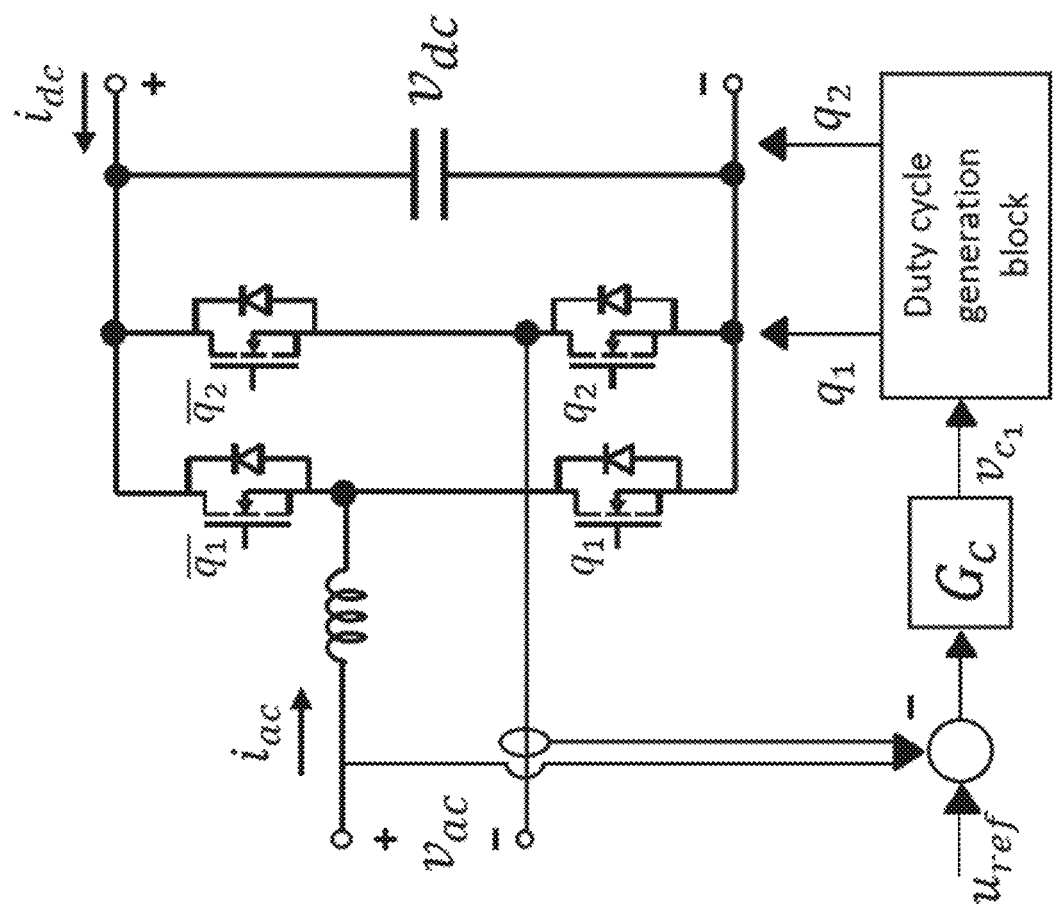
FIG. 18 shows an example implementation of a bridgeless boost ac-dc/dc-ac converter.

The converter can process reactive power if phase shift is introduced in the current reference command. Experimental results validating reactive power processing capabilities of the converter are shown in FIG. 18. It can be observed that the input current has phase shift with respect to input voltage of the converter and thus the converter is processing both active and reactive power.

Figure 19:
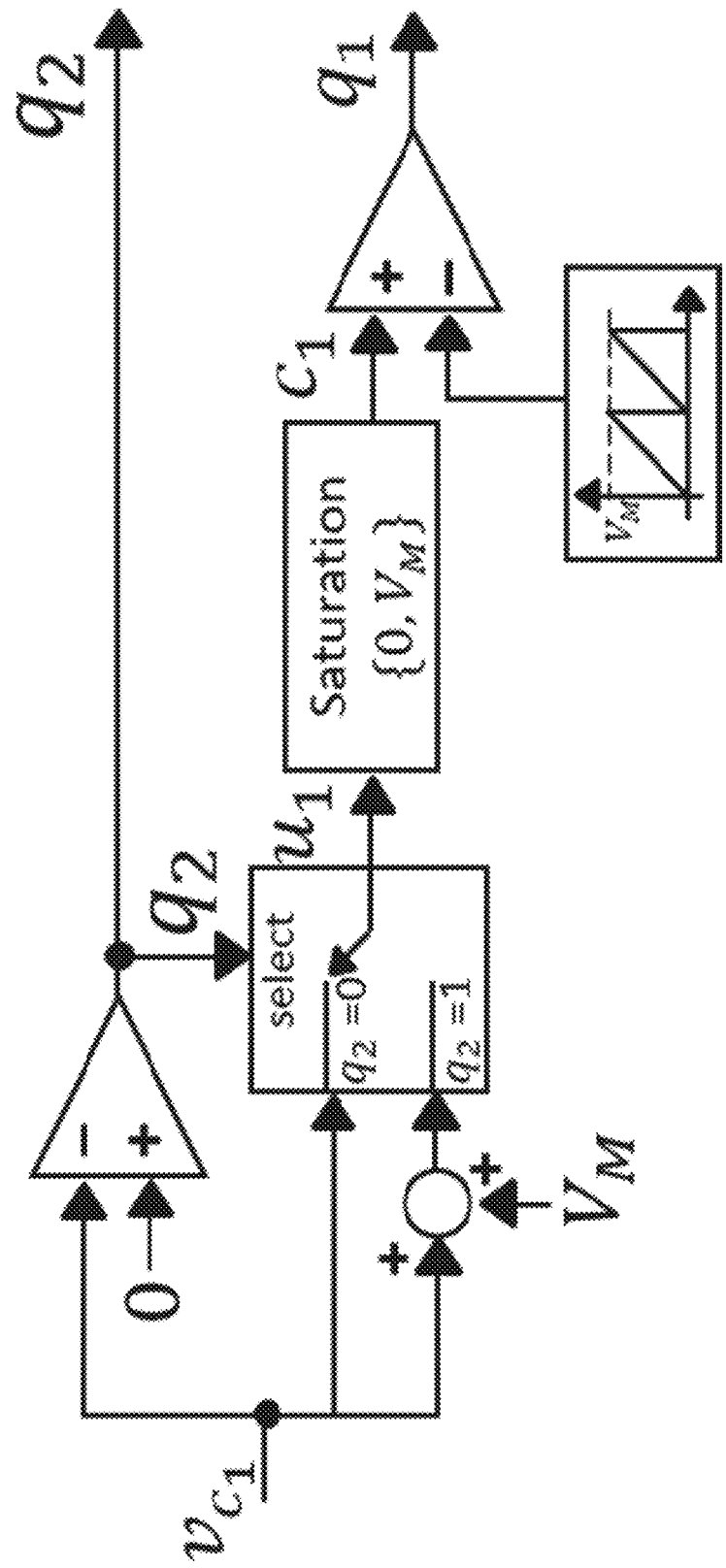
FIG. 19 shows details of an example implementation of a duty cycle generation block associated with the converter of FIG. 19.

Example Variant:

The architecture presented in FIG. 3A can be realized in many different ways. The basic innovation is the use of unrectified sensed ac signals in the generation of the control commands for the converter, and the design of the controller that enables this to happen. The concept can be applied to different power stage topologies. One bridgeless boost topology was discussed above. A second example implementation is shown in FIG. 18, which is another type of bridgeless boost converter with all the input inductance moved to one leg of the converter. One leg of the converter, switching with duty cycle $d_1$, switches at converter switching frequency, while the other leg, switching with duty cycle $d_2$ acts as an unfolder and switches at twice the line frequency. The control architecture for making the converter behave as ac-dc/dc-ac converter is shown in FIG. 18, where ac voltage or ac current is sensed, compared with the reference command and the error between the two is passed to the compensator. The compensator processes the error signal and passes the control command $Vc_1$ to the duty cycle generation block. The duty cycle generation block is shown in FIG. 19. Zero crossings of the control signal $v_c$, are detected by means of a comparator and are used to control the switching of the unfolder leg of the converter by producing duty cycle $d_2$. Duty cycle $d_1$ is generated from the control command by either directly using the control signal or adding ramp amplitude to it, depending upon polarity of the control signal $Vc_1$, which is then compared with the ramp signal to generate switch command $q_1$, as shown in FIG. 19.

Figure 20:
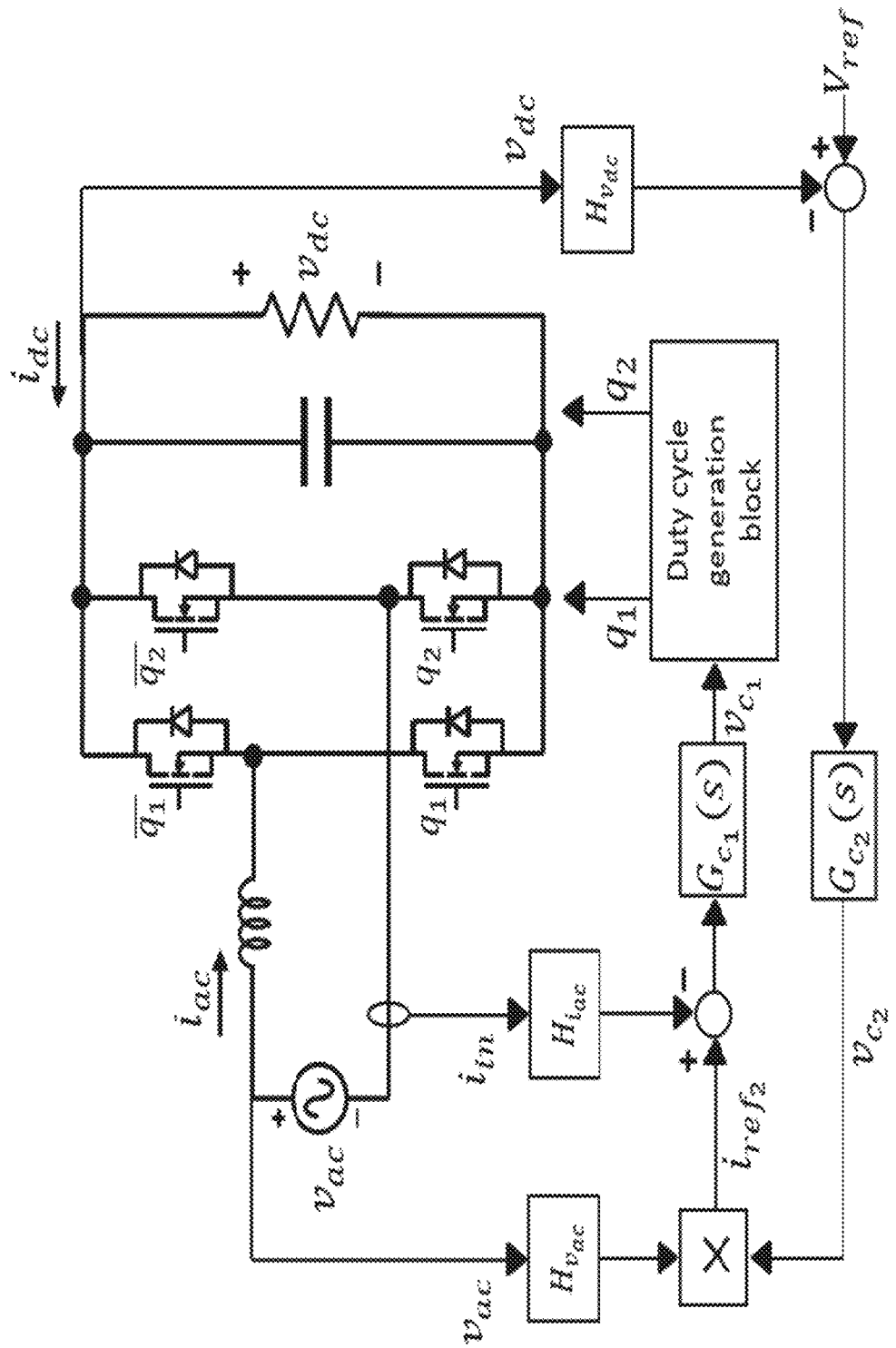
FIG. 20 shows an example implementation of a bridgeless boost ac-dc/dc-ac converter configured for use with an UPF ac-dc conversion.
Figure 21:
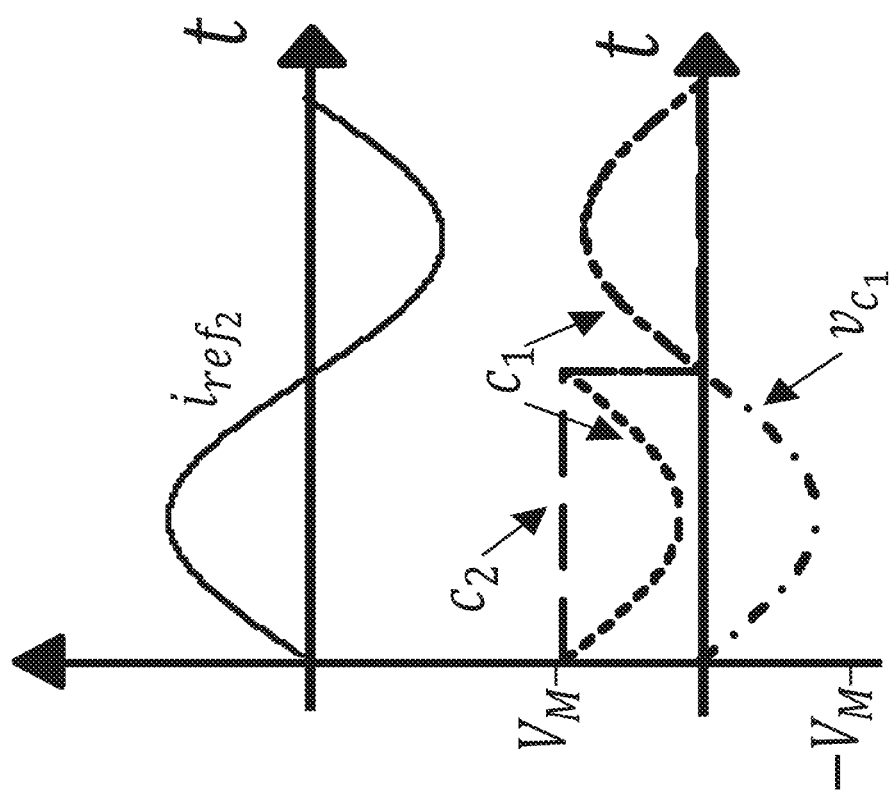
FIG. 21 shows example current reference, control command $v_{c_1}$ and duty cycles $d_1$ and $d_2$ plotted over half line cycle.

The converter and control architecture can be used as an ac-dc/dc-ac converter, following the lines of what has been presented above. Details for an example implementation UPF ac-dc conversion are provided. When the converter is used for UPF ac-dc conversion, an example control architecture is shown in FIG. 20 and bears similarity to the control architecture presented earlier in FIG. 3A, with differences in the power converter employed and the duty cycle generation block. Example control waveforms of the converter for one complete line cycle are shown in FIG. 21. From FIG. 21 it can be observed that current reference command $i_{ref}$ is a line frequency signal and is used without any rectification in the controller. The controller generates a signal $v_{c_1}$ which is periodic with line frequency and is processed by duty cycle generation block to generate duty cycle commands. Duty cycle $d_2$ switches at the converter zero crossing while duty cycle $d_1$ is generated from the control signal $v_{c_1}$ as is shown in FIG. 21 and discussed earlier.

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A single-phase ac/dc bi-directional power converter comprising:

a single-phase converter stage, wherein the single-phase converter stage comprises a bridgeless boost topology; and a controller comprising a compensator, wherein the controller comprises a duty cycle generation block and the controller is configured to:

receive an unrectified sensed ac voltage and an unrectified sensed ac current from the single-phase converter stage, scale one of the unrectified sensed ac voltage and the unrectified sensed ac current to generate a reference, determine a difference between the other one of the unrectified sensed ac voltage and the unrectified sensed ac current and the reference to generate an error signal, provide the error signal to the compensator, and generate a duty cycle command for the single-phase converter stage based at least in part on an output of the compensator;

wherein:

the duty cycle generation block is configured such that an output of the compensator is added and/or subtracted to an amplitude of a ramp voltage or another non-zero constant within the duty cycle generation block, and the duty cycle generation block is configured such that an output of the compensator is sent to a first block and a second block, in the first block the output of the compensator is added to an amplitude of the ramp voltage and a sum is sent to a saturation block, an output of the saturation block is then compared with the ramp voltage to generate a duty cycle for a first leg of the bridgeless boost topology and in the second block the output of the compensator is subtracted from the amplitude of the ramp voltage and the difference is sent to a second saturation block, the output of the second saturation block is then compared with the ramp voltage to generate the duty cycle for a second leg of the bridgeless boost topology.

2. The single-phase ac/dc bi-directional power converter of claim 1 wherein the single-phase ac/dc bi-directional power converter is configured to act as either an ac-to-dc rectifier or a dc-to-ac inverter and is further configured to process reactive power.

3. The single-phase ac/dc bi-directional power converter of claim 1 wherein the controller comprises the duty cycle generation block with a single input received from the output of the compensator.

4. The single-phase ac/dc bi-directional power converter of claim 1 wherein one of the unrectified sensed ac voltage and the unrectified sensed ac current is phase shifted before being used to generate the reference to introduce an equivalent phase shift between a line voltage and a line current so as to inject or absorb reactive power from an ac port.

5. The single-phase ac/dc bi-directional power converter of claim 4 wherein the phase shift is a non-180-degree phase shift.

6. The single-phase ac/dc bi-directional power converter of claim 1 wherein the controller generates two duty cycle commands, each one for a different bridge leg, and provides the two duty cycle commands to the single-phase converter stage.

7. The single-phase ac/dc bi-directional power converter of claim 1 wherein the single-phase converter stage comprises a bridgeless boost ac-dc/dc-ac converter configured for use as unity power factor ac-dc conversion.

8. The single-phase ac/dc bi-directional power converter of claim 1 wherein the reference comprises a current reference that is determined based on a sensed dc voltage and the unrectified sensed ac voltage.

9. A single-phase ac/dc bi-directional power converter comprising:
   a single-phase converter stage, wherein the single-phase converter stage comprises a bridgeless boost topology; and
   a controller comprising a compensator, wherein the controller comprises a duty cycle generation block and the controller is configured to:
      receive an unrectified sensed ac voltage or an unrectified sensed ac current from the single-phase converter stage,
      determine a difference between the unrectified sensed ac voltage or the unrectified sensed ac current and a reference to generate an error signal,
      provide the error signal to the compensator, and
      generate a duty cycle command for the single-phase converter stage based at least in part on an output of the compensator,
   wherein:
      the duty cycle generation block is configured such that an output of the compensator is added and/or subtracted to an amplitude of a ramp voltage or another non-zero constant within the duty cycle generation block, and
      the duty cycle generation block is configured such that an output of the compensator is sent to a first block and a second block, in the first block the output of the compensator is added to the amplitude of the ramp voltage and a sum is sent to a saturation block, an output of the saturation block is then compared with the ramp voltage to generate a duty cycle for a first leg of the bridgeless boost topology and in the second block the output of the compensator is subtracted from the amplitude of the ramp voltage and the difference is sent to a second saturation block, the output of the second saturation block is then compared with the ramp voltage to generate the duty cycle for a second leg of the bridgeless boost topology.

10. A single-phase ac/dc bi-directional power converter of claim 9 wherein the reference is sinusoidal.

11. A single-phase ac/dc bi-directional power converter comprising:
   a single-phase converter stage, wherein the single-phase converter stage comprises a bridgeless boost topology; and
   a controller comprising a compensator, wherein the controller comprises a duty cycle generation block and the controller is configured to:
      receive an unrectified sensed ac voltage and an unrectified sensed ac current from the single-phase converter stage, scale one of the unrectified sensed ac voltage and the unrectified sensed ac current to generate a reference,
      determine a difference between the other one of the unrectified sensed ac voltage and the unrectified sensed ac current and the reference to generate an error signal,
      provide the error signal to the compensator, and
      generate a duty cycle command for the single-phase converter stage based at least in part on an output of the compensator;
   wherein:
      the duty cycle generation block is configured such that an output of the compensator is sent to a first block and a second block, in the first block the output of the compensator is compared with zero to generate a binary duty cycle signal for a first leg of the bridgeless boost topology and in the second block the output of the compensator is directly sent if a duty cycle of first leg is 0 or is added to an amplitude of a ramp voltage and a sum is sent if the duty cycle of first leg is 1 to a second saturation block, the output of the second saturation block is then compared with the ramp voltage to generate the duty cycle for a second leg of the bridgeless boost topology.

* * * * *